United States Patent [19]

Childress et al.

[11] Patent Number: 5,175,866
[45] Date of Patent: Dec. 29, 1992

[54] FAIL-SOFT ARCHITECTURE FOR PUBLIC TRUNKING SYSTEM

[75] Inventors: Jeffrey S. Childress; Houston H. Hughes, III, both of Lynchburg, Va.

[73] Assignee: Ericcson GE Mobile Communications Inc., Lynchburg, Va.

[21] Appl. No.: 532,164

[22] Filed: Jun. 5, 1990

Related U.S. Application Data

[63] Continuation of Ser. No. 57,046, Jun. 3, 1987, abandoned.

[51] Int. Cl.⁵ .................. H04B 1/74; H04M 3/22
[52] U.S. Cl. ................................ 455/8; 455/9; 455/16; 455/34.1; 455/53.1; 379/9; 379/63; 379/269; 379/279; 370/58.3
[58] Field of Search ............ 455/8, 9, 11, 16, 34, 455/53, 56, 54; 379/9, 58, 63, 269, 279, 296; 370/58.3

[56] References Cited

U.S. PATENT DOCUMENTS

| | | | |
|---|---|---|---|
| 3,292,178 | 12/1966 | Magnuski | 455/38 |
| 3,458,664 | 7/1969 | Adlhoch et al. | 379/63 |
| 3,571,519 | 3/1971 | Tsimbidis | 379/63 |
| 3,696,210 | 10/1972 | Peterson et al. | 370/13 |
| 3,801,956 | 4/1974 | Braun et al. | 340/146.2 |
| 3,806,804 | 4/1974 | Mills et al. | 455/34 |
| 3,906,166 | 9/1975 | Cooper et al. | 379/60 |
| 3,936,616 | 2/1976 | DiGianfilippo | 379/63 |
| 3,970,801 | 7/1976 | Ross et al. | 379/63 |
| 4,001,693 | 5/1977 | Stackhouse et al. | 455/51 |
| 4,010,327 | 3/1977 | Kobrinetz et al. | 423/150 |
| 4,012,597 | 3/1977 | Lynk, Jr. et al. | 455/53 |

(List continued on next page.)

FOREIGN PATENT DOCUMENTS

87/01537 3/1987 PCT Int'l Appl.

OTHER PUBLICATIONS

"E. F. Johnson Clears the Air About Trunked Radio", E. F. Johnson Company, Radio Products Division, Waseca, Minn. 56093, booklet, 12 pp., (Oct. 1985).

"Clearchannel LTR Trunked Radios from Johnson", E. F. Johnson Company, Waseca, Minn. 56093, brochure, 6 pp. (1986).

"LTR 8000 Repeater", Service Manual, Clearchannel LTR Repeater, third printing, E. F. Johnson Company, (1983).

"Johnson LTR 8800/8850 Control Station", Service Manual, E. F. Johnson Company, (1981).

Federal Information Processing Standards, Pub. No. 46, Data Encryption Standard, U.S. Dept. of Comm., NTIS, (5285 Port Royal Rd., Springfield, VA. 22161).

"Voice and Data Transmission", Arrendondo, Teggeler and Smith, Bell Systems Technology Journal, vol. 58, No. 1, Jan. 1978, pp. 97-122.

*Primary Examiner*—Gilberto Barron, Jr.
*Attorney, Agent, or Firm*—Nixon & Vanderhye

[57] ABSTRACT

A site architecture for a trunked radio frequency communications system provides better fault tolerance capabilities than are available from architectures including redundant hardware. During normal system operations, a primary site controller performs most or all system control functions while signal processing functions are performed in a distributed manner by trunking cards associated with individual repeater channel receivers and transmitters. In the event the site controller fails, the trunking cards also begin performing trunking and other control functions. The trunking cards cease attempting to communicate with the failed site controller, and begin communicating directly with one another via a high speed backup serial link. Through the distributed processing routines performed by the various trunking cards and interaction between the trunking cards over the backup serial link, trunking and other capabilities are maintained even though the primary site controller has failed (although advanced features such as call logging and the like are lost). Because trunking capability is maintained, failure of the primary site controller has little or no effect on ongoing communications and is virtually transparent to mobile unit operators.

48 Claims, 16 Drawing Sheets

U.S. PATENT DOCUMENTS

| | | | |
|---|---|---|---|
| 4,022,973 | 5/1977 | Stackhouse | 375/114 |
| 4,027,243 | 5/1977 | Stackhouse | 375/114 |
| 4,029,901 | 6/1977 | Campbell | 379/58 |
| 4,128,740 | 12/1978 | Graziano | 455/33 |
| 4,131,849 | 12/1978 | Freeburg et al. | 375/5 |
| 4,184,118 | 1/1980 | Cannalte et al. | 370/77 |
| 4,231,114 | 10/1980 | Dolikian | 455/49 |
| 4,267,593 | 5/1981 | Craiglow | 370/29 |
| 4,309,772 | 1/1982 | Kloker et al. | 375/76 |
| 4,312,070 | 1/1982 | Coombes et al. | 371/40 |
| 4,312,074 | 1/1982 | Pautler et al. | 375/96 |
| 4,322,576 | 3/1982 | Miller | 370/99 X |
| 4,326,264 | 4/1982 | Cohen et al. | 364/900 |
| 4,339,823 | 7/1982 | Predina et al. | 375/20 |
| 4,347,625 | 8/1982 | Williams | 455/17 |
| 4,354,267 | 10/1982 | Mori et al. | 340/825.01 X |
| 4,360,927 | 11/1982 | Bowen et al. | 455/17 |
| 4,369,443 | 1/1983 | Giallanza et al. | 340/825.47 |
| 4,382,298 | 5/1983 | Evans | 371/6 |
| 4,400,585 | 8/1983 | Kamen et al. | 455/34 X |
| 4,409,687 | 10/1983 | Berti et al. | 455/7 |
| 4,418,425 | 11/1983 | Fennel, Jr. et al. | 380/33 |
| 4,430,742 | 2/1984 | Milleker et al. | 375/5 |
| 4,430,755 | 2/1984 | Nadir et al. | 455/77 |
| 4,433,256 | 2/1984 | Dolikian | 307/358 |
| 4,434,323 | 2/1984 | Levine et al. | 178/22.17 |
| 4,450,573 | 5/1984 | Noble | 375/104 |
| 4,485,486 | 11/1984 | Webb et al. | 455/33 |
| 4,553,262 | 11/1985 | Coe | 455/15 |
| 4,578,815 | 3/1986 | Persinotti | 455/15 |
| 4,583,218 | 4/1986 | Ardon et al. | 370/58.3 |
| 4,698,805 | 10/1987 | Sasuta et al. | 370/97 |

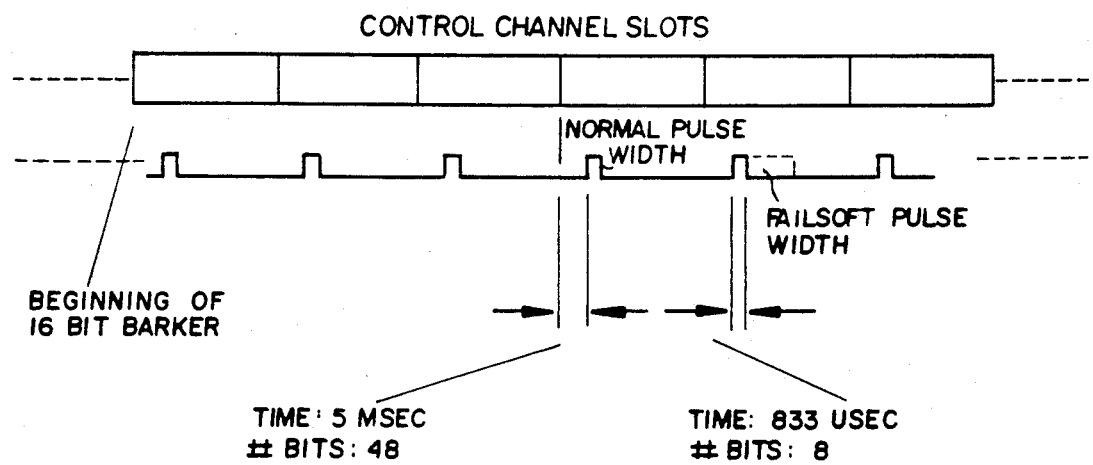
FIG. 5
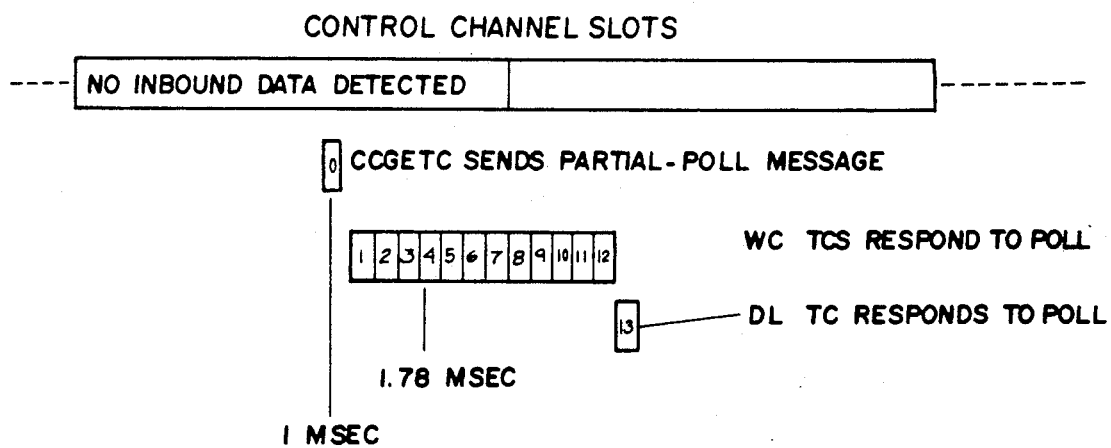
FIG. 7 PARTIAL/ALL-POLL MESSAGE AND RESPONSE TIMING

FIG. 6A

| POLLING BYTE (8) (AAH) | MESSAGE TYPE (8) | RADIO/ CONSOLE ORIG (4) | MT-A (2) | TYPE COMM. (2) | CALLING LOGICAL ID 6 MSBs | GROUP/LOGICAL ID (1) | CHANNEL (5) | CALLED GROUP ID (12) | HANG TIME (8) | CALLING LOG. ID 6 LSBs | STD/ SPCL (1) | RPT/ NORM (1) | PARITY (8) |

CHANNEL ASSIGNMENT MSG

FIG. 6B

| START (1) | POLL TYPE (3) | NOT USED (3) | POLL/ RESPONSE (1) | PARITY (1) | STOP (1) |

POLLING MSG

FIG. 6C

| PARITY BIT | RESPONSE BIT | ASSIGNED BIT | CHANNEL (5 BITS) |

POLL RESPONSE MSG (1 BYTE)

FIG. 6D

| POLLING BYTE (AA) | MESSAGE TYPE (10) | MT-A (2) | TYPE COMM. (2) | CALLED LOGICAL ID | CALLER GROUP/LOGICAL ID | PARITY |

DOWNLINK CHANNEL REQUEST

FIG. 6E

| POLLING BYTE | MT-A (2) | SUBCOUNT | LOGICAL ID | PARITY |

CHANNEL UNKEY MSG

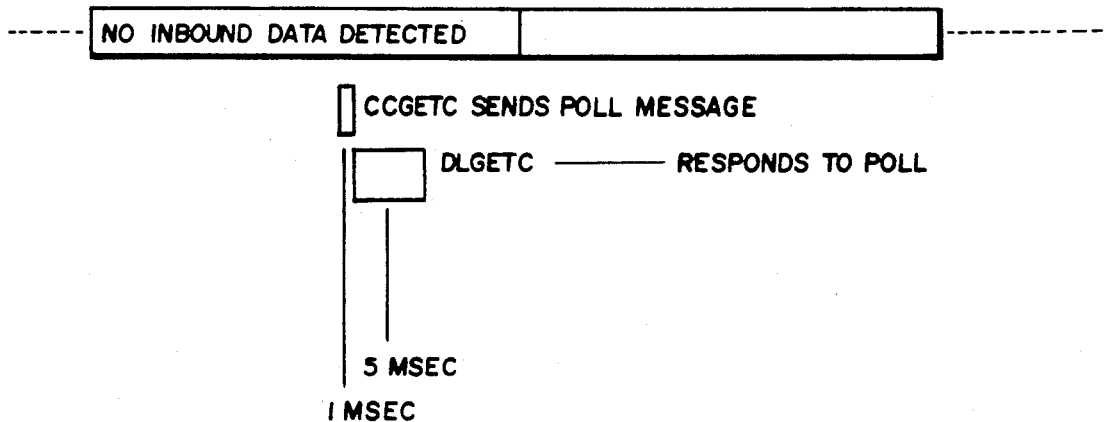
FIG. 8 DLGETC POLL MESSAGE AND RESPONSE TIMING
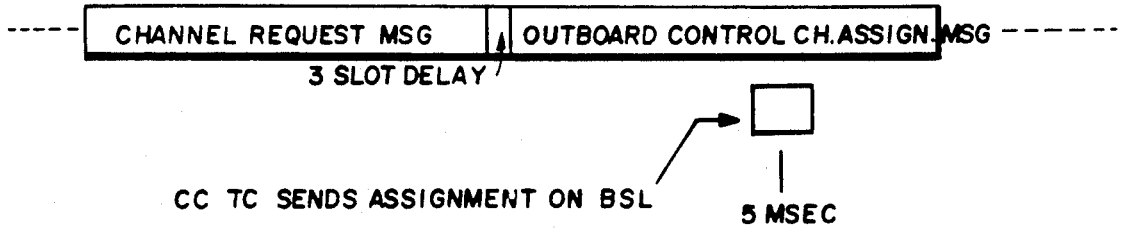
FIG. 9 BSL CHANNEL ASSIGNMENT

TRUNKING CARD NORMAL/FAILSOFT LOGIC

TRUNKING CARD CONTROL CHANNEL SERIAL LINK SUPERVISORY ROUTINE

FIG. 12 TRUNKING CARD WORKING CHANNEL SERIAL LINK SUPERVISORY ROUTINE

TRUNKING CARD DOWNLINK SERIAL LINK SUPERVISORY ROUTINE

FIG. 14    PST RADIO CALL SEQUENCE FAIL SOFT
RADIO ORIGINATION, INDIVIDUAL CALL

FAULT TOLERANT DESIGN METHODOLOGY

FAIL-SOFT ARCHITECTURE FOR PUBLIC TRUNKING SYSTEM

This is a continuation of U.S. patent application Ser. No. 07/057,046, filed Jun. 3, 1987, now abandoned.

CROSS-REFERENCE TO RELATED APPLICATIONS

This application is related to the following copending commonly-assigned applications (all of which are incorporated herein by reference); U.S. patent Ser. No. 056,922 filed Jun. 3, 1987 of Childress entitled "Trunked Radio Repeater System" now U.S. Pat. No. 9,905,302; and U.S. patent Ser. No. 085,572 filed Aug. 14, 1987 of Nazarenko et al. entitled "Processor-To-Processor Communications Protocol For A Public Service Trunking System" now U.S. Pat. No. 4,835,731.

This invention is generally directed to the art of trunked radio repeater systems. It is more particularly directed to a radio frequency repeater site architecture with a "fail soft" feature which provides trunking and other communications capability despite failure of major components of the architecture (e.g., the primary site controller).

Radio repeater trunking (time sharing of a single repeater communications channel among many users) is well-known. Early trunking systems used analog control signals while some more recent systems have utilized digital control signals. Control signals have been utilized on a dedicated control channel and/or on different ones of the working channels for various different reasons and effects. A non-exhaustive but somewhat representative sampling of publications and patents describing typical prior art trunked radio repeater systems is identified below:

U.S. Pat. No. 3,292,178, Magnuski (1966)
U.S. Pat. No. 3,458,664, Adlhoch et al. (1969)
U.S. Pat. No. 3,571,519, Tsimbidis (1971)
U.S. Pat. No. 3,696,210, Peterson et al. (1972)
U.S. Pat. No. 3,906,166, Cooper et al. (1975)
U.S. Pat. No. 3,936,616, DiGianfilippo (1976)
U.S. Pat. No. 3,970,801, Ross et al (1976)
U.S. Pat. No. 4,001,693, Stackhouse et al (1977)
U.S. Pat. No. 4,010,327, Kobrinetz et al (1977)
U.S. Pat. No. 4,012,597, Lynk, Jr. et al (1977)
U.S. Pat. No. 4,022,973, Stackhouse et al (1977)
U.S. Pat. No. 4,027,243, Stackhouse et al (1977)
U.S. Pat. No. 4,029,901, Campbell (1977)
U.S. Pat. No. 4,128,740, Graziano (1978)
U.S. Pat. No. 4,131,849, Freeburg et al (1978)
U.S. Pat. No. 4,184,118, Cannalte et al (1980)
U.S. Pat. No. 4,231,114, Dolikian (1980)
U.S. Pat. No. 4,309,772, Kloker et al (1982)
U.S. Pat. No. 4,312,070, Coombes et al (1982)
U.S. Pat. No. 4,312,074, Pautler et al (1982)
U.S. Pat. No. 4,326,264, Cohen et al (1982)
U.S. Pat. No. 4,339,823, Predina et al (1982)
U.S. Pat. No. 4,347,625, Williams (1982)
U.S. Pat. No. 4,360,927, Bowen et al (1982)
U S. Pat. No. 4,400,585, Kamen et al (1982)
U.S. Pat. No. 4,409,687, Berti et al (1983)
U.S. Pat. No. 4,430,742, Milleker et al (1984)
U.S. Pat. No. 4,430,755, Nadir et al (1984)
U.S. Pat. No. 4,433,256, Dolikian (1984)
U.S. Pat. No. 4,450,573, Noble (1984)
U.S. Pat. No. 4,485,486, Webb et al (1984)
U.S. Pat. No. 4,578,815, Persinotti (1985)

The Bowen et al system is an example of prior art switched channel repeater systems which avoid using a dedicated control channel—in part by providing a handshake with the repeater site controller on a seized "idle" working channel before communication with the called unit(s) is permitted to proceed.

There are many actual and potential applications for trunked radio repeater systems. However, one of the more important applications is for public service trunked (PST) systems. For example, one metropolitan area may advantageously utilize a single system of trunked radio repeaters to provide efficient radio communications between individual radio units within many different agencies. Each agency may, in turn, achieve efficient communication between individual units of different fleets or sub-units (e.g., the police department may have a need to provide efficient communications between different units of its squad car force, different units of detectives or narcotics agents and the like). Sometimes it may be important to communicate simultaneously to predefined groups of units (e.g., all units, all of the squad cars, all of the foot patrolmen, etc.). At the same time, other agencies (e.g., the fire department, the transportation department, the water department, the emergency/rescue services, etc.) may be in need of similar communication services. As is well-known to those familiar with trunking theory, a relatively small number of radio repeaters can efficiently service all of these needs within a given geographic area if they are trunked (i.e., shared on an "as-needed" basis between all potential units).

There are a variety of trunked communications systems on the market today, each with its own set of advantages and disadvantages. The one thing all such systems have in common is architectures which (1) prohibit the use of optimum signalling baud rates, (2) inhibit diagnosis, localization and correction of hardware failures; and (3) cannot continue to support trunked operation should any non-RF signal point failure occur. The importance of each of these three points will be discussed individually.

(1) Optimum Signalling Rates

The telecommunications industry invested substantial time and money towards determining the optimal way of transmitting data at 800 MHz for the cellular telephone network. Data transmission efficiency is important since it increases both frequency efficiency and user efficiency of a system. It was concluded that the optimal baud rate is the highest baud rate of bilevel encoded data that the channel bandwidth would support. For Public Service Trunking (PST) systems having a 25 KHz channel bandwidth, 9600 baud is the highest rate that can be supported. Nevertheless, due to hardware and architecture which are unable to support the higher processing requirements associated with a higher baud rate, existing systems either use low baud rates (300 baud) or suboptimal baud rates (3600 baud).

(2) Localization and Correction of Hardware Failures

A computer primary site controller which oversees site activity and detects site faults expedites the failure detection and correction process. On the other hand, if that same computer embodies all intelligence at the site, then fault detection within the controller itself becomes difficult to perform. Existing systems either have no computer to effectively detect failures, or a computer which contains all site intelligence (and thus cannot effectively diagnose or recover from its own failure).

(3) Trunked Fail Soft Operations

There are at least three reasons why site controller failure should not eliminate trunking capability. First, since the system is trunked, more radios probably reside on the system than if it were a conventional system—and consequently, elimination of the trunked mode causes system overload (since a trunked system can handle far more traffic than a non-trunked system). This can result in units being forced off the system—or units being unable to access the system to begin with.

Second, changing the mode of operation as seen by the users (e.g., from a trunked system to a system in which users must select their own operating frequencies manually) creates additional confusion, particularly when a user is forced to listen to all conversations—even those that don't pertain to him/her (in a typical trunked system, only those units intended to be a part of a communication tune to the frequency on which the communication takes place).

Third, site controller failures are not statistically independent from emergency situations in the field. For example, the very storm that might cause emergencies in the field could cause power problems damaging the site controller. The advantages provided by a trunked communication system may thus be needed most at the time the site controller fails.

Fault tolerance can be the most sophisticated portion of a system, and is not achieved effectively as an afterthought to the system design process. Yet to date, trunked communication systems have been designed with little regard towards fault tolerance, forcing the end user to tie up capital in redundant hardware in order to obtain reliability. Affording the end user with a truly fault tolerant trunked communications system requires system design and engineering considerations throughout the development cycle, beginning with the very conception of the system itself.

A trunked communication system must be evaluated based on all aspects of system operation, including its fault tolerance. A repeater site architecture for a trunked (or even a non-trunked) communications system has been developed which has excellent fault tolerance and therefore overcomes the aforementioned shortcomings inherent in all other known existing trunking systems. Briefly, the present invention provides a unique site architecture which separates signal processing functions from data processing and control functions—and distributes both types of processing functions throughout the architecture.

Signal processing hardware (embodied in a so-called "trunking card", or "TC") dedicated to each radio frequency channel (and to a radio transmitter and receiver operating on the channel) provides the signal processing required for its associated channel. Each dedicated signal processing trunking card operates essentially independently except for higher-level required control coordination with other trunking cards and with the primary site controller computer. During normal operation of the system, most control functions are performed by the site controller (e.g., a high speed computer with advanced, real time control capabilities)—leaving the trunking card processors free to devote all of their processing resources to processing signals associated with the specific RF channels they are dedicated to. Synchronization lines and serial communications lines are shared among all of the channel processing trunking cards—but flow of control information during normal system operation is between the trunking cards and the site controller.

One of the channel signal processing trunking cards is assigned to operate on a dedicated trunking control channel (any of the trunking cards are capable of operating on the control channel, but an arbitrary trunking card is assigned—if the assigned card fails, another trunking card takes its place). All mobile units not engaged in active communications on a working channel monitor the control channel—and there receive instructions to move to a working channel to communicate with other mobile units or with the console.

In prior art systems, failure of the site controller causes the entire system to cease operating (or at best, begin operating in a non-trunked mode with each channel operating independently as a repeater with little or no coordination between the operation of different channels) unless and until an alternate site controller can be brought on line. In the system of the present invention, the trunking card assigned to operate on the control channel almost instantly detects failure of the site controller, and upon such detection, controls the trunking cards to operate in a "fail soft" mode in which the trunking cards no longer attempt to communicate with the failed site controller but instead communicate control information with one another over a backup serial link (BSL) not used during normal system operation. Communications between the trunking cards over the backup serial link is coordinated by the control channel trunking card so that each trunking card independently maintains system status information, and each trunking card updates the control channel trunking card and all other trunking cards with changes in status.

In fail soft mode, control functions handled by the site controller during normal mode operation are handled in a distributed fashion by the trunking cards. For example, a down link trunking card which simply passes messages between the site controller and the operator control console during normal mode operation begins communicating messages originated by the console directly to working channel trunking cards and the control channel trunking card over the BSL during fail soft operation, and also monitors status messages generated by the various trunking cards and passes those message on to the console. The control channel trunking card begins assigning working channels for trunked communications when the fail soft mode is invoked instead of relying on the site controller to assign channels. The working channel trunking cards also begin performing control functions in the fail soft mode which are performed by the site controller in the normal mode.

Although advanced control functions (e.g., call logging, dynamic regrouping, and the like) are lost when the fail soft mode is invoked, trunking capabilities are maintained because trunking control functions are distributed among the trunking cards. As a result, failure of the primary site controller has little or no effect on normal communications and trunking capability.

In somewhat more detail, during fail soft mode the control channel trunking card determines during each inbound control channel slot (a time interval during which a mobile or portable transceiver transmits its working channel acquisition request) if a message is being received. If an incoming message is arriving, the trunking card assigned to the control channel processes the message. For example, if the incoming message is from a mobile unit requesting to communicate with another mobile unit, the control channel trunking card selects a free working channel, communicates a channel assignment message to the calling and called mobile units over the control channel, and also communicates the channel assignment message to the selected working channel trunking card over the backup serial link.

On the other hand, if no message is being received, the trunking card assigned to the control channel polls the other trunking cards in the system for status information, each trunking card responding over the backup serial link within a corresponding time slot assigned to it. The entire polling process is completed rapidly (e.g., prior to the end of the inbound control channel message slot).

The trunking card assigned to the control channel periodically sends synchronization signals to the other trunking card over a synchronization line during both normal and fail soft modes of operation—causing those other units to loosely synchronize working channel communications with the control channel communications. The control channel trunking card is the "master" of site synchronization timing, since it controls the timing of the synchronization line connected to all of the other trunking cards. In the preferred embodiment, the width of the sync pulses generated by the control channel trunking card is used to indicate to the other trunking cards whether the system is in normal or failsoft operation.

Because each channel trunking card independently processes the RF signals being transmitted and received by its associated repeater on an associated channel, rapid rate signalling (e.g., 9600 baud) can be supported without overloading the site controller (all signal processing is performed within the trunking cards themselves) during normal operation and during fail soft operation. Each trunking card is connected to the primary site controller computer via a separate parallel (e.g., RS-232C) data link. Thus, failure of a parallel link and/or a trunking card does not disturb communications between the primary controller and the remaining trunking cards. Moreover, this feature permits the site controller (or a human service technician) to more accurately diagnose any faults that do occur.

Perhaps one of the most important advantages of the site architecture provided by the present invention is that no single point failure can eliminate trunking functionality.

Should the site controller computer fail, higher-level system features (e.g., call logging and dynamic regrouping) are lost, but signal processing—and more importantly, trunking capability—is still performed in a distributed fashion by the channel trunking cards (since sufficient computational power exists within each trunking card to perform trunking control processing). Should a trunking card fail, the unit can be removed from service and normal operations can continue with one less RF channel. All trunking cards are identical in the preferred embodiment (and all are programmed identically), so in the event the trunking card assigned to operate on the control channel fails, that trunking card can be removed from service and another trunking card can be assigned to operate on the control channel (each channel trunking card is capable of acting as the control channel trunking card).

The system of this invention is sometimes termed a "digitally" trunked system because trunking control is effected by digital signals passed over a continuously dedicated "control" data channel. All units are programmed so as to automatically revert to the predetermined primary control channel upon being turned on or being reset. If the expected control channel data format is not there discovered, then alternate possible control channels are successively monitored in a predetermined sequence until an active control channel is discovered. In this manner, the usual control channel apparatus at the central control site may be temporarily removed from service (e.g., for maintenance purposes). This same feature also permits continued trunked system operation in the event that the regular control channel unexpectedly malfunctions or is otherwise taken out of service.

Should the backup serial link between the trunking cards fail while the primary site controller is still operational, no operational features are lost because the serial link and the site controller communication paths are used alternately. If the synchronization link between the trunking cards fails, RF channel access time increases slightly (e.g., from 280 milliseconds to 320 milliseconds) due to loss of loose synchronization between the control and working channels, but this slight access time increase is not noticeable to the user.

Perhaps one of the greatest advantages of the site architecture provided by the present invention is its fault tolerance characteristics. Prior repeater architectures have been provided with some degree of fault tolerance only by providing redundant hardware such as a backup site controller. This redundant hardware solution is not only expensive, but is less reliable than the distributed processing architecture provided by the present invention. For example, the portion of the system which activates backup hardware can itself fail in the redundant hardware approach and prevent the system from recovering.

Technology has finally made fault tolerant trunked communication systems a reality. The architecture provided by the present invention, with just one general purpose site controller, exhibits a three times greater trunking reliability than the trunking reliability of a non-fault tolerant architecture with a custom site controller supported by a "hot" standby site controller unit.

In light of today's communication needs, and what current technology can deliver, fault tolerant trunked communication systems are mandated. Appraising a system's capabilities requires understanding the tradeoffs made by the designers in establishing a balance between functionality, cost, and fault tolerance. And in the end, the effective evaluation of a system enables one to weed out those that talk fault tolerance from those that deliver it.

These as well as other features and advantages of this invention will be more completely understood and appreciated by carefully studying the following detailed description of the presently preferred exemplary embodiment taken in conjunction with the accompanying drawings, of which:

FIG. 5 is a schematic diagram of synchronization control line timing in the system of FIG. 2;

FIGS. 6A-6E are schematic diagrams of exemplary signalling protocols for the messages sent on the backup serial link shown in FIG. 2;

FIG. 7 is a schematic diagram of exemplary backup serial link polling message and response timings of the FIG. 2 system;

FIG. 8 is a schematic diagram of exemplary backup serial link downlink poll and response timings of the FIG. 2 system;

FIG. 9 is a schematic diagram of exemplary backup serial link channel assignment message timings of the FIG. 2 system;

Figure 1:
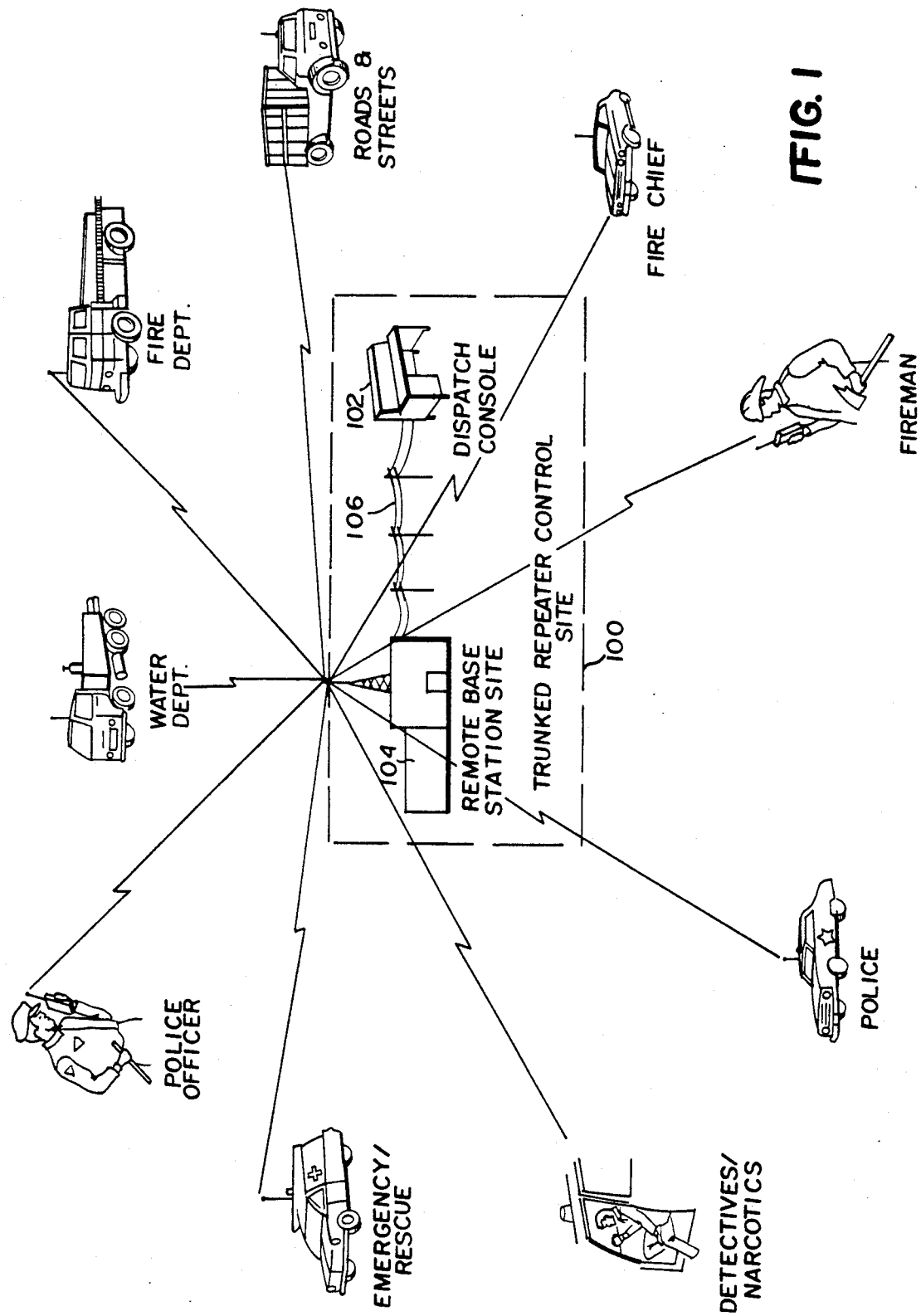
FIG. 1 is a general explanatory diagram of a trunked radio repeater system in accordance with this invention.

An exemplary trunked radio repeater system in accordance with this invention is generally depicted at FIG. 1. As illustrated, individual units of various groups communicate with each other (both within and possible outside of their own group) via shared radio repeaters which are part of a trunked repeater system 100. The dispatch console 102 may be housed directly at the repeater system site 104 or may be remotely located via other communication facilities 106 as will be appreciated by those in the art. There also may be multiple dispatch consoles 102 (e.g., one for each separate fleet) and a master or supervisory dispatch console for the entire system as will also be appreciated by those in the art.

Figure 2:
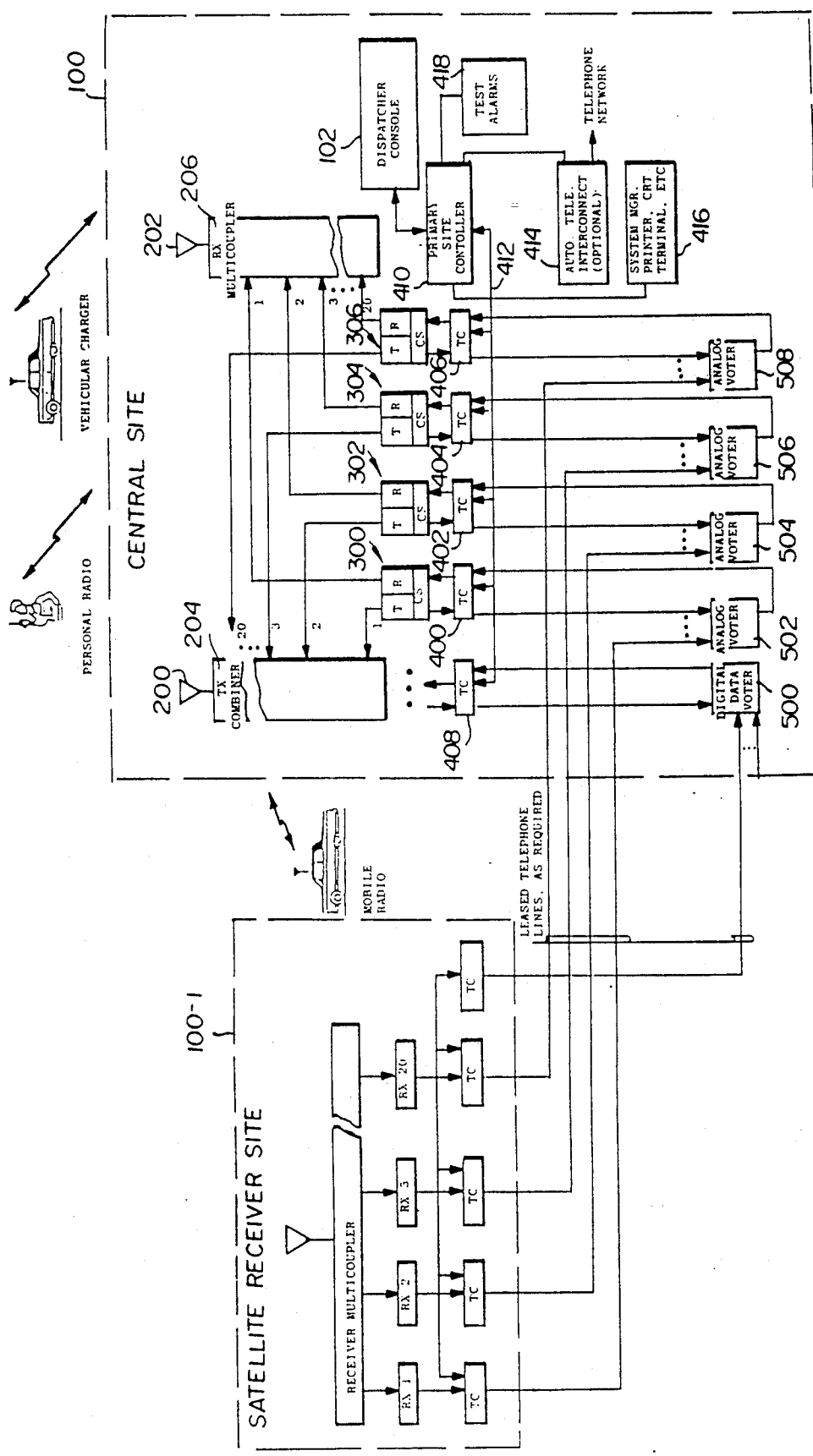
FIG. 2 is a simplified block diagram of a central control site (as well as a satellite receiver site) in the trunked repeater system of FIG. 1.

The central system 100 is depicted in somewhat more detail at FIG. 2 in conjunction with one or more satellite receiver systems 100-1. As will be appreciated, the satellite receiver systems are displaced spatially from the central site 100 such that radio reception may temporarily be better at one or the other of the chosen antenna systems. Thus, received signals from the satellite sites as well as the central systems are combined in "voter" circuitry so as to choose the best available signal for control or communication processes.

At the central site, a transmitting antenna 200 and receiving antenna 202 (which may sometimes be a common antenna structure) may be utilized with conventional signal combining/decombining circuits 204, 206 as will be apparent to those in the art. The transmitting and receiving RF antenna circuitry 200-206 thus individually services a plurality of duplex RF channel transmit/receive circuits included in a plurality of RF repeater "stations" 300, 302, 304, 306, etc. Typically, there may be 24 such stations. Each station transmitter and receiver circuitry is typically controlled by a dedicated control shelf CS (e.g., a microprocessor-based control circuit) as is also generally depicted in FIG. 2. Such control shelf logic circuits associated with each station are, in turn, controlled by trunking cards TC (e.g., further microprocessor-based logic control circuits) 400, 402, 404 and 406. Another trunking card 408 may be dedicated for digital data communications if desired.

All of the trunking cards 400-408 communicate with one another and/or with a primary site controller 410 via control data bus 412. The primary site controller (and optional backup controllers if desired) may be a commercially available general purpose processor (e.g., a PDP 11/73 processor with 18 MHz-J11 chip set). Although the major "intelligence" and control capability for the entire system resides within controller 410, alternate backup or "fail soft" control functions are incorporated within the trunking cards 400-408 so as to provide continued trunked repeater service even in the event that controller 410 malfunctions or is otherwise taken out of service.

An optional telephone interconnect 414 may also be provided to the public switched telephone network. Typically, a system manager terminal, printer, etc., 416 is also provided for overall system management and control (together with one or more dispatcher consoles 102). A special test and alarming facility 418 may also be provided if desired.

The signal "voter" circuits 500, 502, 504, 506 and 508 are connected so as to receive a plurality of input digital or analog signals and to selectively output therefrom the strongest and/or otherwise most reliable one of the input signals. Thus, received signals from the central system site 100 are input to respective ones of the channel voter circuits 500-508 while additional similar input signals are generated from receivers in the satellite receiver site 100-1 and also input to the appropriate respective voter circuits. The results of the voting process are then passed back to the trunking card circuits 400-408 where they are further processed as the valid "received" signals.

Figure 3:
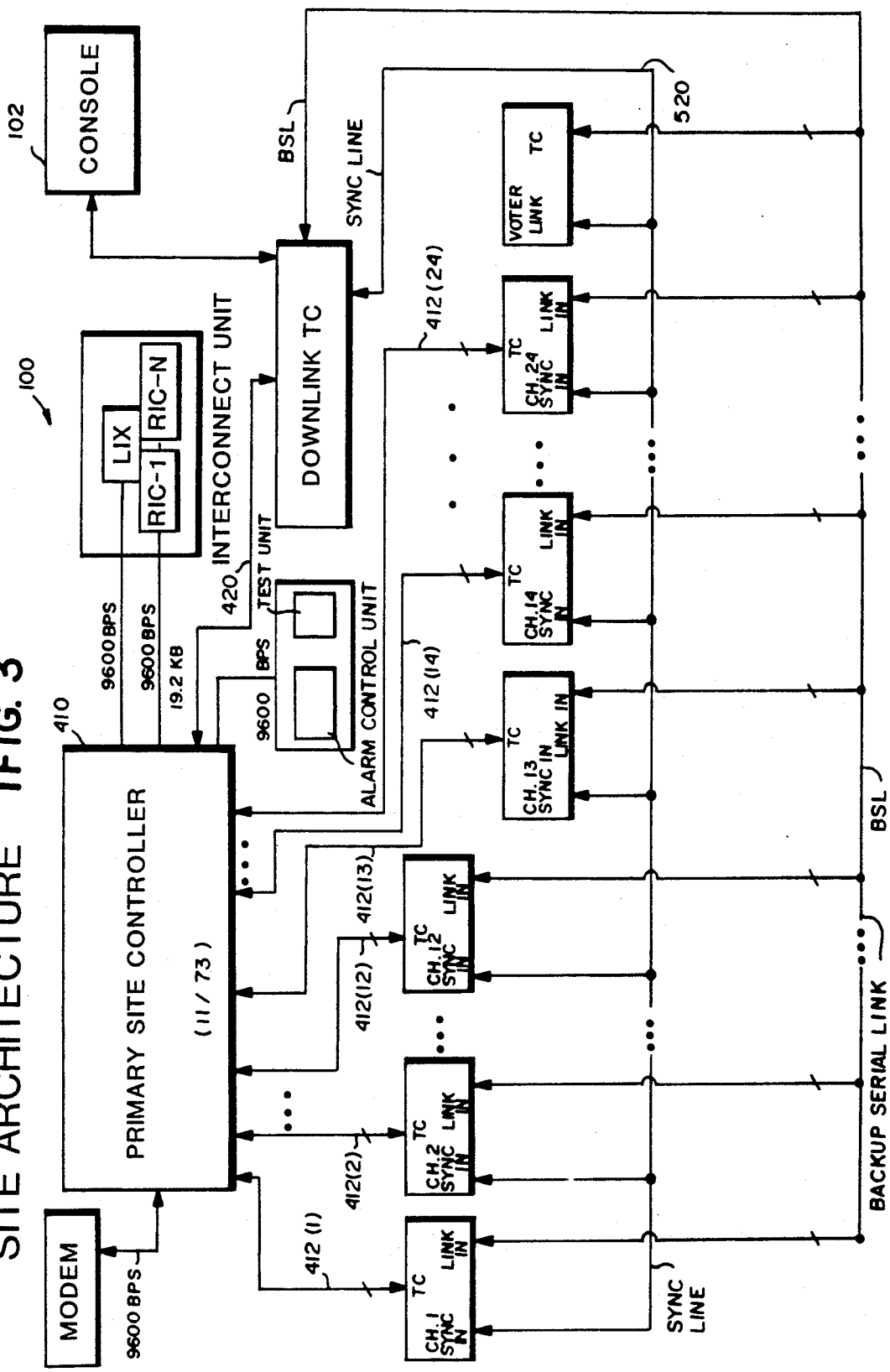
FIG. 3 is a simplified block diagram of the general site architecture of the main controller for the central control site.

A slightly more detailed view of the site architecture for control data communication is shown in FIG. 3. Here, the PDP 11/73 controller 410 is seen to communicate over 19.2 Kilobyte buses 412 with up to 24 trunking control cards TC controlling respective duplex repeater circuits in those individual channels. Another high-speed 19.2 Kilobyte bus 420 is used in the down link to/from the dispatch console 102 (this downlink including a downlink trunking card). Other data communication with the central processor 410 is via 9600 baud links as shown in FIG. 3. The site controller 410 may include, for example, a 128 Kilobyte code PROM, 1 Megabyte of RAM and 32 DHV-11/J compatible RS-232C ports (connected to respective ones of busses 412). Controller 410 may typically be programmed using micropower Pascal to provide a multi-tasking, event-driven operating system to manage all of the various data communication ports on an acceptable real time basis.

At each controlled repeater channel, the 19.2 Kilobyte data bus 412 (as well as another similar bus connected to an optional backup site controller if desired) is monitored by an 8031 microprocessor in the TC module. The TC trunking control module may typically also receive hard-wired inputs providing clock synchronization and a "fail soft" indication (e.g., indicating that normal control by the central controller 410 is not available and that an alternate distributed control algorithm should then be implemented within each of the trunking control modules TC). Control over the control shelf CS of its associated repeater is then achieved conventionally with dedicated audio and signalling audio and control buses. In the preferred embodiment, conventional dedicated audio signal paths (not shown) connect each control shelf CS with console 102, and a conventional audio path switch (also not shown) is capable of connecting audio signal paths of selected control shelves to other selected control shelves, the telephone interconnect block 414, the console 102, etc.

Figure 4:
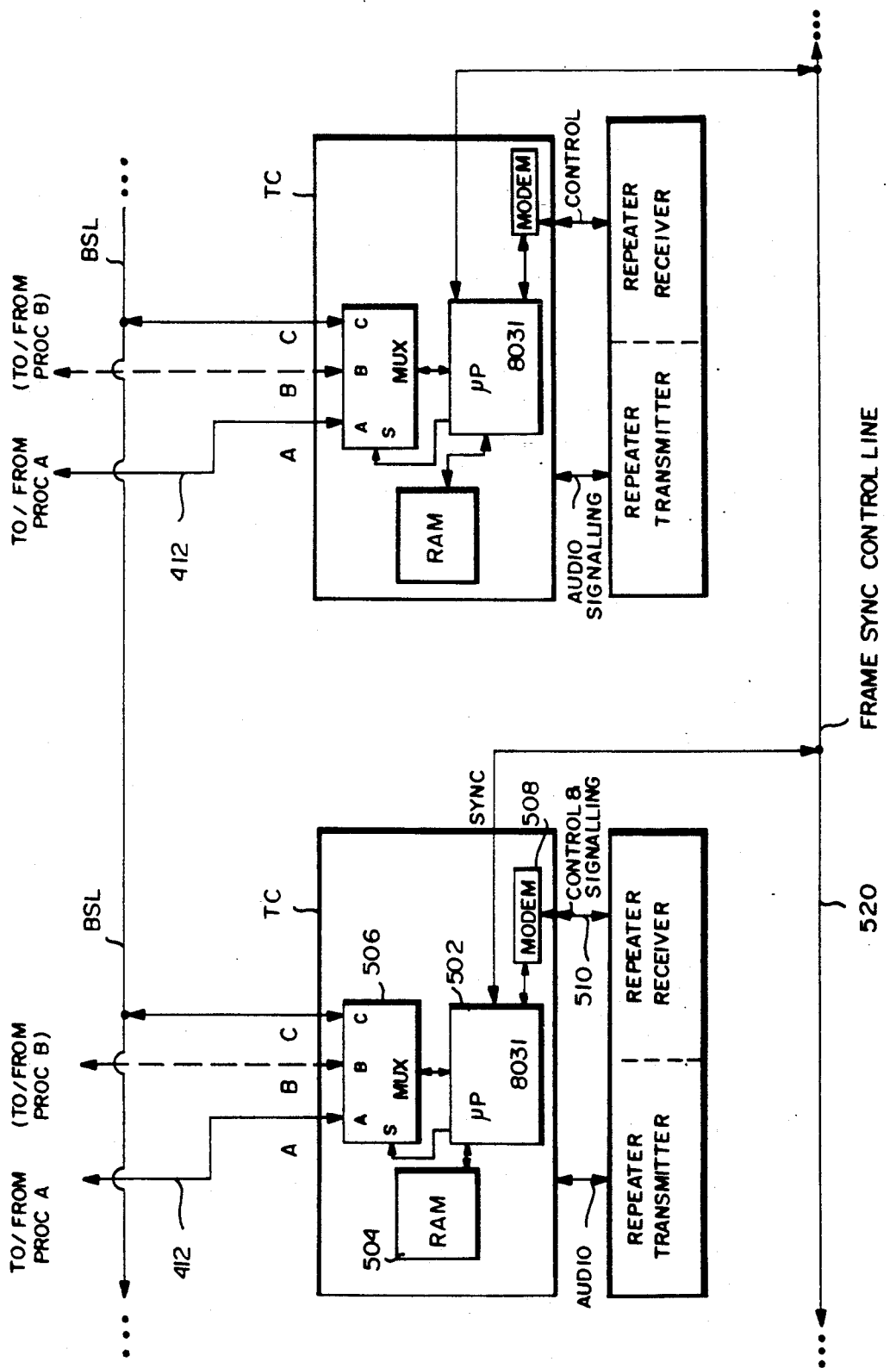
FIG. 4 is a simplified block diagram of channel trunking cards used within the various channels of the central site architecture shown in FIG. 3.

Referring now to FIG. 4, in the preferred embodiment, each trunking card TC includes a microprocessor 502 and associated random access memory (RAM) 504, a multiplexer 506, and a modem 508. Microprocessor 502 executes software stored in random access memory 504 (which is preferably non-volatile) in order to implement various control functions, including "failsoft" modes of operation. Microprocessor 502 transmits digital control signals to its associated repeater transmitter and receiver via modem 508 and dedicated serial control line 510. For example, microprocessor 502 can key and unkey the associated repeater transmitter, control the repeater transmitter and receiver to process audio or digital signals, and disconnect power from the transmitter and receiver in order to avoid waste of energy. Also via path 510 and modem 508, digital signals received by the repeater receiver are communicated to microprocessor 502 and digital signals to be transmitted are communicated from the microprocessor to the repeater transmitter.

Each trunking card TC has three serial ports A, B and C. Multiplexer 506 selects only one of received ports A, B, C to be monitored by the trunking card at any one time (the select input of the multiplexer being controlled by microprocessor 502, Port A is connected to primary site controller 410 via a dedicated parallel RS-232 line 412. Port B is connected to an alternate site controller (if one is used) via a similar dedicated RS-232 signal path. Port C is connected to backup serial link BSL—which interconnects all of trunking cards TC in daisy-chain fashion (as is shown in FIG. 3).

If multiplexer 506 selects port A (which it typically does during normal operation of the system), it receives messages (in digital signal form) from primary site controller 410 and also sends messages to the primary site controller as well as to the alternate site controller over the parallel line connected to Port B). Similarly, if multiplexer 506 selects Port B, it receives messages from the alternate site controller (and not primary site controller 410), but all messages microprocessor 502 sends to the alternate site controller are also sent to the primary site controller. In this way, the alternate site controller is constantly being updated with status change information, and can immediately take over control of the system if the primary site controller fails.

During normal operation, the trunking cards relate process received signals and signals to be transmitted, and perform very few control functions—all or most of the control functions being performed by primary site controller 410 (or the alternate site controller if that controller is active). Primary site controller 410 executes multi-tasking event-driven software to provide advanced control functions (e.g., call logging, dynamic regrouping, etc.) as well as simple control functions (e.g., trunking channel assignments, priority call handling and the like) as described in copending U.S. patent application Ser. No. 056,922 filed Jun. 3, 1987 of Childress et al entitled "Trunked Radio Repeater System" now U.S. Pat. No. 4,905,702.

During normal system operation, the trunking cards generally simply pass received digital control signals on to primary site controller 410, pass digital control signals to be transmitted from the primary site controller to their associated repeater transmitters, and performed various other operations (e.g., initiate transmissions, unkey their associated repeater transmitters, and the like) directly in response to control signals sent to them by a primary site controller. During normal operations, microprocessor 502 devotes most of its processing resources to processing signals received by a single repeater receiver and signals to be transmitted by a single repeater transmitter—so that the system of the preferred embodiment supports very high data transmission rates (e.g., 9600 baud).

During the normal mode of operation of system 100, backup serial link BSL is not used or needed. The independent operations of the various trunking cards are coordinated by primary site controller 410, and signal processing operations performed by the various trunking cards are loosely synchronized by synchronization signals produced by one of the trunking cards assigned to the control channel, these synchronization signals being communicated to the rest of the trunking cards via frame sync control line 520.

Frame sync control line 520 is a single line that connects all of the trunking cards together in daisy-chain fashion. This control line 520 is used by whichever trunking card is assigned to the control channel to notify all other trunking cards of the beginning of each slot on the outbound control channel.

One of the trunking cards and associated repeater transmitter and receiver is assigned to operate on the predetermined full duplex control communications channel. This control channel is monitored by mobile units whenever they are not actually engaged in communications (such communications being performed on working channels assigned to the other trunking cards). Briefly, the control channel is "slotted" (i.e., time division multiplexed), and "outbound" control channel signals are continuously transmitted by the control channel transmitter. Mobile units monitoring the control channel synchronize with the frame synchronization signals transmitted continuously on the outbound control channel, reducing the time required by the mobile units to synchronously receive and transmit control channel signals.

In the preferred embodiment, the trunking card assigned to supervise control channel operations originates the control channel frame synchronization timing signals, and places those timing signals on frame sync control line 520 (as well as passing them to its associated control channel repeater transmitter for transmission on the outbound control channel). Referring to FIG. 5, the control channel trunking card generates a synchronization pulse of about 833 microseconds in duration approximately 5 milliseconds (48 bits) after the beginning of each outbound control channel slot (the beginning of a slot being indicated by transmission of a 16 bit Barker code). Although any trunking card is capable of driving frame sync control line 520 (since any channel can be called upon to execute the control channel function), only the trunking card currently assigned to the control channel actually drives this line. The beginning of each control channel slot is marked by a positive going pulse on the frame sync control line 520.

Each of the other trunking cards of system 100 continuously monitors the frame sync control line 520, and the microprocessors of these other trunking cards synchronize signal processing functions with the pulses on the sync control line (and thus with the timing of the control channel). When a mobile unit receives a command transmitted on the outgoing control channel to change frequency to a working channel, the mobile unit is already synchronized with the control channel timing. Since all working channels are synchronized with the control channel by frame sync control line 520—and the mobile unit remains synchronized with the control channel timing until it begins receiving working channel signals (which are loosely synchronized with the control channel signals), communications between the mobile unit and the working channel transmitter and receiver is very rapidly established and no lengthy process of resynchronizing the mobile unit with independent working channel timing is necessary.

System 100 in the preferred embodiment thus uses common timing for all of the working channels and the control channel (as well as the downlink).

In the preferred embodiment of system 100, the duration of the pulses applied to frame sync control line 520 indicate whether the system is in the normal mode or the failsoft mode. The control channel trunking card tests for failure of primary site controller 410, and if a failure occurs (and the alternate site controller is not available or not installed), it causes the system to begin operating in the failsoft mode by increasing the duration of the synchronization pulses it applies to frame sync control line 520. In the preferred embodiment, the synchronization pulses have a duration of 833 microseconds (8 bit timings) during normal operation, and have an increased duration of about 2.5 milliseconds (24 bit timings) when system 100 is in failsoft.

Electrical isolation circuitry of conventional design is used to electrically isolate the trunking cards from frame sync control line 520, thereby reducing the chance that the frame sync control line will fail upon failure of any trunking card. If the control channel trunking card fails to apply synchronization pulses to line 520 (or the line itself fails), all other trunking cards use their own internally-generated independent synchronization timings instead of the control channel synchronization timing. Working channel access time is increased when the working channels are no longer synchronized with the control channel, but the slight increase (from 280 milliseconds to 320 milliseconds) due to loss of loose synchronization between the control and working channels is not noticeable to users of mobile units.

When system 100 in the preferred embodiment begins operating in the failsoft mode, the multiplexers 506 of all trunking cards select port C and the backup serial link (BSL) becomes active (during normal operation in the preferred embodiment, the BSL does not carry any signals). When failsoft is invoked, the trunking cards cease passing signals to and receiving signals from the primary site controller 410, and instead, control steps implementing trunking and other functionality are performed in a distributed fashion by the trunking cards with signals being communicated between the trunking cards via the BSL. While failure of the BSL would prevent system 100 from operating in the failsoft mode in the preferred embodiment, it is highly unlikely that the BSL and the primary site controller (as well as the optional alternate site controller) would all fail at the same time.

The BSL communicates control signals between the trunking cards when system 100 is in the failsoft mode. The control channel trunking card is master of the BSL—no other trunking card transmits on the BSL except in response to a poll message from the control channel trunking card. In the preferred embodiment, message protocol for the BSL is as follows:

| Start bit | (1) |
| --- | --- |
| Data bit | (8) |
| Stop bit | (1) |

Communications on the BSL is half-duplex. Only a few different types of messages are carried by the BSL in the preferred embodiment. Such messages include an update poll message, an all-poll message, a downlink poll message, and a channel assignment message. Working channels are assigned with channel assignment messages carried by the BSL. Update poll and all poll messages are used to maintain current channel assignment information within each trunking card (and particularly within the control channel trunking card)—as well as to permit the downlink trunking card to notify the system console 102 of channel availability and other status information. Downlink polls provide a mechanism for granting the downlink trunking card authorization to place console-generated channel assignment and channel unkey messages on the BSL.

Approximately 20 milliseconds after the beginning of each frame of the inbound control channel, the control channel trunking card determines whether an inbound message (e.g., a mobile unit-generated channel assignment request message) is present. If an inbound message is present, the control channel trunking card waits until the message is received, and responds to it if it is a group call, individual call, or emergency call channel request message (all other inbound messages are ignored in the preferred embodiment during failsoft). In response to a channel request message, the control channel trunking card assigns a working channel (if one is available) by generating a channel assignment message, transmitting the channel assignment message on the outbound control channel, and also applying the channel assignment message to the BSL. The trunking card associated with the working channel being assigned by the channel assignment message constantly monitors the BSL, and establishes communications with the requesting mobile unit in response to the BSL-carried channel assignment message.

Working channels are "dropped" (i.e., become inactive) as soon as signals transmitted on them terminate (in the preferred embodiment, the "hang time" during which a working channel remains allocated to a particular communication after the mobile unit on the active working channel (or the console) unkeys is very short except when special priority, emergency calls are being handled). In the preferred embodiment, the trunking card associated with a working channel unkeys its associated transmitter and ceases to process incoming working channel signals as soon as (or very shortly after) a communicated message ends. Thus, working channels become free for reassignment as soon as they no longer carry active conversations—and working channel trunking cards independently and autonomously discontinue service to working channels.

When system 100 is in the failsoft mode, the control channel trunking card uses polling to determine when channels have been dropped and are available for reassignment. An update poll message is used to request responses from all working channel trunking cards having a status which has changed since the last poll message. An all-poll message forces all channels to respond, and is sent at least once every two seconds to all trunking cards in the preferred embodiment. Any trunking card that fails to respond to the all-poll message is considered to be unoperational by the control channel trunking card and is removed from service (although not actually physically disconnected in the preferred embodiment).

In the preferred embodiment of system 100, there are 24 trunking cards as well as a downlink trunking card. In order to increase the rate at which polls are responded to, any given update poll or all-poll message communicated over the BSL is directed to only half of the trunking cards (although every poll prompts a response from the downlink trunking card). Thus, not all working channels are polled at once. Instead, the low or high 12 channels are polled with either an update poll or an all-poll message. An exemplary format for a typical polling message in the preferred embodiment is shown in FIG. 6B.

In the preferred embodiment, the BSL is timed-shared between all of the trunking cards, and signals carried by it are timed-division multiplexed in order to prevent data transmission collisions from occurring. Each trunking card transmits a response to a poll directed to it during a predetermined time period (slot) assigned to it. The control channel inbound frame is divided into fifteen equal slots each having a duration of 1.778 milliseconds. When the control channel trunking card determines that no inbound message is present, it transmits its poll message (either an all poll or an update poll message) during slot 0 (see FIG. 7).

As can be seen from FIG. 6C (a schematic diagram of an exemplary format for a poll response message), poll response messages are relatively short in the preferred embodiment—including only a parity bit, a response bit (always set for a poll response), a bit indicating whether the responding channel is assigned or unassigned (this bit is set if the channel is assigned and is otherwise unset), and a 4 bit field identifying the responding channel. Downlink trunking card poll responses are in the same format in the preferred embodiment, except that the assigned/unassigned bit is set if the downlink trunking card has received a message from the console and is otherwise unset.

In the preferred embodiment, the "poll type" field of the polling message (an exemplary format of which is shown in FIG. 6B) specifies the type of poll: update poll channels 1-12 (3BH), update poll channels 13-24 (3DH), all poll channels 1-12 (2FH), or all poll channels 13-24 (2CH). A code 23H in this "poll type" field indicates a downlink poll, and the code AAH in this field indicates that the message contains the first byte of the channel assignment message).

Trunking cards 412(1)-412(12) respond to an update poll channels 1-12 message or all poll channels 1-12 message by placing poll responses in slots 1-12 respectively following the slot 0 used to indicate a poll request (see FIG. 7). The downlink trunking card responds during the thirteenth time slot of an update poll or all poll to channels 1-12, and also responds during the thirteenth time slot of an update poll or all poll to channels 13-24. Trunking cards 412(13)-412(24) respond during time slots 1-12, respectively of an update poll or all poll directed to channels 13-24.

The all-poll message requires all trunking cards associated with channels the all poll is directed to (as well as the downlink trunking card) to respond so that the control channel trunking card (and working channel trunking cards, which generate subaudible status signals) can determine which trunking cards are operational. Any trunking card which does not respond to an all poll directed to it is considered to be unavailable by the control channel trunking card. All poll messages directed to channels 1-12 and 13-24 are sent by the control channel trunking card about once every 2 seconds.

The update poll message requires all noncontrol channel trunking cards having states which have changed since the last poll (update poll or all poll) to respond. The update poll messages are sent every control channel time slot except those during which the BSL is used to carry a different kind of message (e.g., an all-poll message, a downlink poll message, or a channel assignment message). Update poll message responses inform system 100 in failsoft which working channels have been dropped and are available for reassignment.

A downlink poll message is a special message which requires the downlink trunking card to respond by placing a control message it has received from the console onto the BSL. When system 100 is in the normal mode and site controller 410 is operating normally, the downlink trunking card communicates messages between the site controller and console 102. Console 102 is used by a dispatcher to initiate, monitor and otherwise participate in calls. During normal operation, messages generated by the console are communicated to the downlink trunking card (which in the preferred embodiment is identical to the control channel and working channel trunking cards) which simply passes the messages on to the site controller (such messages include channel request messages and the like). The site controller performs the tasks requested by the console messages, and then sends responsive/confirmation messages back to the downlink trunking card for communication back up to the console.

When system 100 is in failsoft mode, the downlink trunking card ceases communicating with the failed site controller 410 and instead communicates messages between the console 102 and the BSL. In failsoft, the types of console messages supported may be somewhat more limited than the messages supported during normal operation. In the preferred embodiment, the downlink trunking card is capable of transferring channel request messages and unkey messages from the console to the BSL during failsoft operation. FIG. 6D is a schematic diagram of an exemplary format for a downlink originated channel request message, and FIG. 6E shows an exemplary format for a downlink originated channel unkey message. The downlink trunking card also communicates messages (e.g., unkey messages and status information messages) from the BSL up to console 102.

When a downlink trunking card receives a channel request or unkey message from the console during failsoft, it waits for the next all poll or update poll message to be generated by the control channel trunking card, and then responds to that poll message with an indication that it has received a console message. The control channel trunking card soon thereafter originates a downlink poll message—authorizing the downlink trunking card to place the message it has received from the console onto the BSL (see FIG. 8).

The control channel trunking card monitors downlink poll responses to determine whether the console at the dispatch center has requested a channel assignment, since the control channel trunking card must generate a channel assignment message in response to the downlink channel request message. As mentioned previously, active working channel trunking cards independently drop their channels as soon as communications have ended and only notify the control channel trunking card that they have dropped channel upon receiving the next update poll or all-poll message. Each working channel trunking card also monitors the downlink poll responses to determine whether or not to drop channel (unkey) at the direction of the console. Although the control channel trunking card generates console channel request messages to assign channels, it is the working channel trunking cards themselves that release active working channels in response to channel unkey messages produced by the downlink trunking card in response to downlink polls.

The downlink trunking card monitors all traffic on the BSL, and constantly updates the console with the contents of channel assignment messages, mobile unit originated channel request messages, and channel active/inactive status. This information is used by the console to provide indications to console operators of ongoing communications and to confirm that actions requested by the operators have been successfully taken.

FIG. 6A is a schematic diagram of an exemplary format for a channel assignment message generated by the control channel trunking card in response to either a mobile unit originated channel request message received by the control channel repeater receiver or to a console originated channel request message placed on the BSL by the downlink trunking card. The control channel trunking card causes the channel assignment message to be transmitted on the outbound control channel, and during the same control channel time slot, also places the channel assignment message on the BSL. The channel assignment message transmitted on the outbound control channel is received by all mobile units monitoring the control channel, and directs specified mobile units (or groups of mobile units) to a specified working channel (the control channel trunking card maintains a table of available channels and constantly updates this table based upon responses to its polls, so that it can always determine which channels are available and assign an available working channel).

The working channel trunking cards all monitor the channel assignment messages carried by the BSL, and the trunking card associated with an affected working channel responds to the working channel assignment message by transmitting a confirmation message, then listening for handshake signalling transmitted by mobile units which have moved to the newly-assigned working channel in response to the channel assignment message on the outbound control channel, and then supporting communications between the mobile units now on the working channel. FIG. 9 is a schematic diagram of the relative timing of a channel request message, outbound control channel assignment message and application of the same channel assignment message to the BSL.

Referring to FIG. 6A, a channel assignment message generated by the control channel trunking card includes a polling byte (code AAH), a message type field (typically code 08H since system 100 supports no special messages when in failsoft), a nibble indicating whether the channel assignment was requested by the console or by a mobile unit, an MT-A code field, a communications type field, a logical identification number of the calling unit (if a mobile unit requested the call), a bit indicating if a group of mobile stations (rather than just an individual mobile unit) has been called, a field containing designation of the channel being assigned (1-24 in the preferred embodiment), a called group ID field indicating the group or individual mobile units being called, a hang time field specifying the length of time the working channel trunking card being assigned should permit the working channel to remain assigned after communications terminates, a standard/special bit (always indicating standard rather than special communications during failsoft in the preferred embodiment), a bit indicating whether incoming messages should or should not be repeated (the value of this bit depends on the type of communication—for example, console-to-individual communications requires no repeating, but console-to-group communications does require repeating), and a 8-bit parity field.

When system 100 is the failsoft mode, it is acceptable for only a subset of the different types of channel assignment messages normally available to be supported. In the preferred embodiment, three types of channel assignment messages are supported during failsoft individual call messages (establishing communication between console and an individual mobile unit or between two individual mobile units), group call messages (establishing communications between the console and a group of mobile units or between all mobile units within a group), and emergency messages (identical to individual or group messages except that the working channel hang time is extended).

FIGS. 10-13 are flow charts of exemplary program control steps performed by the trunking cards of the preferred embodiment to implement the failsoft mode. The operation of system 100 in failsoft mode will now be described in connection with these flowcharts.

Figure 10:
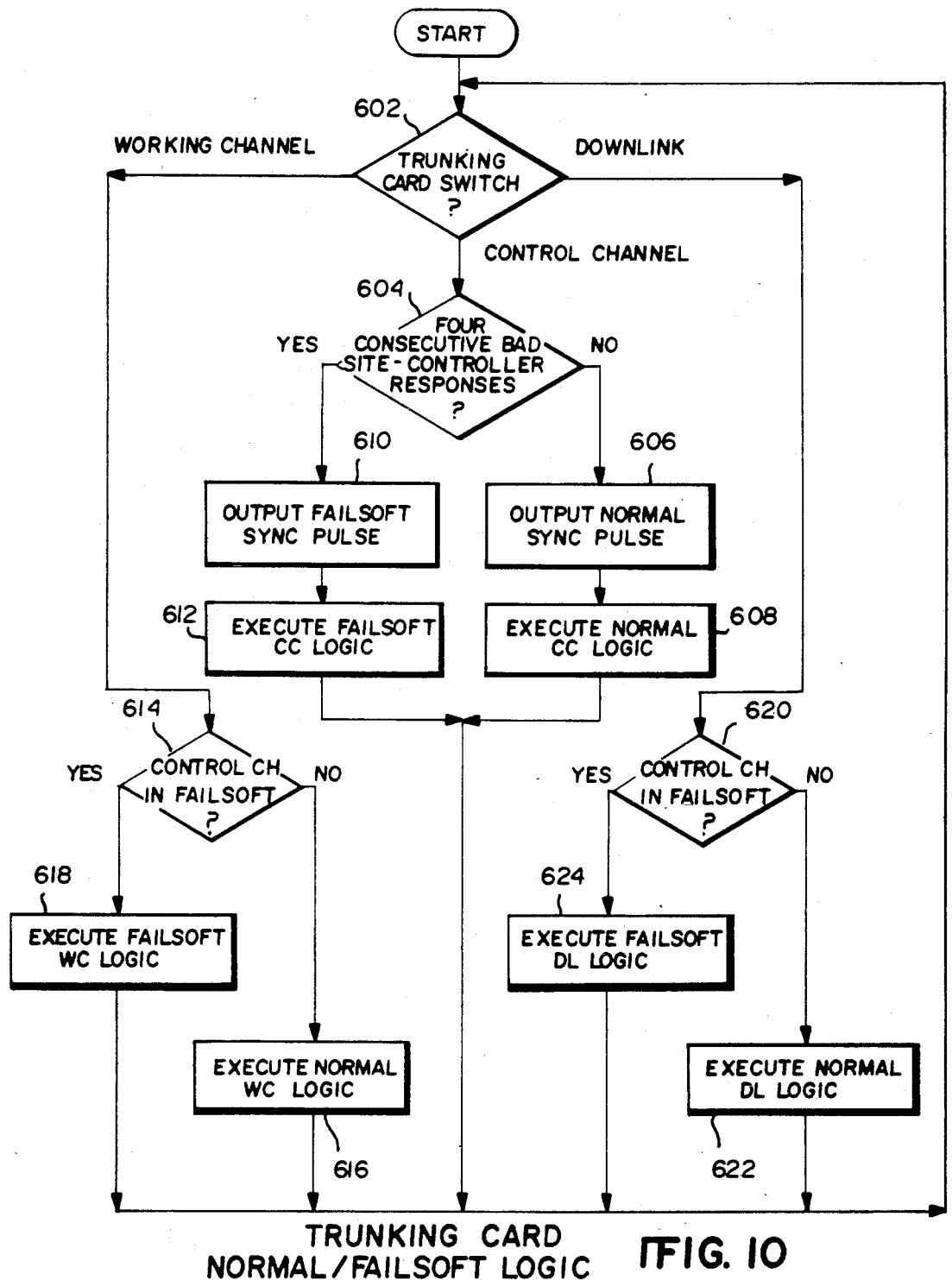
FIGS. 10-13 are flow charts of exemplary program program control steps performed by the trunking cards of the system shown in FIG. 3 to implement the failsoft mode of operation.

FIG. 10 is a flowchart of exemplary program control steps performed by each trunking card to determine whether system 100 is operating in the normal mode or in the failsoft mode. Each trunking card first determines what function it is performing by testing the state of an on-board switch (decision block 602). In the preferred embodiment, all trunking cards are identical in order to promote interchangeability (and to provide other advantages as well). In the preferred embodiment, each trunking card includes an on-board manually-operated three position switch which is used to instruct the trunking card whether it is associated with the control channel, the working channel or the downlink. Decision block 602 simply determines the position of this switch in the preferred embodiment. If desired, a software-maintained register or storage location can be substituted for the manually-operated switch, and the contents of the register can be changed under software control depending upon various conditions so that functions of trunking cards can be interchanged automatically without intervention by a human technician.

The control channel trunking card is the one card in system 100 of the preferred embodiment that can initiate a changeover to the failsoft mode. The control channel trunking card tests whether the primary site controller 410 is operating correctly (e.g., by determining whether four consecutive site controller responses expected by the control channel trunking card over its dedicated RS-232 parallel communication line are "bad"—that is, not present or unintelligible) (decision block 604). If the control channel trunking card determines primary site controller 410 is operating correctly, it continues to apply pulses of normal duration (about 833 microseconds long) to frame sync control line 520 (block 606), and executes a "normal" mode control channel software routine (which, among other things, directs the control channel trunking card to pass all messages it receives from its associated repeater receiver on to parallel site controller 410 and to perform functions it is directed to perform by the primary site controller via control signals passed to it over its associated RS-232 port (block 608). On the other hand, if decision block 604 determines that the primary site controller is not operating properly, the control channel trunking card begins applying wide sync pulses (e.g., 3×833 microseconds long) to sync line 520—thereby indicating to all of the other trunking cards that system 100 is now in the failsoft mode—and begins executing a failsoft software routine which will be discussed in greater detail shortly in connection with FIG. 11 (block 610, 612).

Working channel trunking cards determine whether system 100 is in the failsoft mode by testing the duration of sync pulses they receive over sync line 520 (decision block 614). Working channel trunking cards execute "normal" working channel software routines when system 100 is not in failsoft mode (block 616), and execute failsoft working channel software routines when the system is in the failsoft mode (block 618). Similarly, the downlink trunking card tests the duration of the pulses on sync line 520 to determine whether system 100 is in the failsoft mode (decision block 620), executes "normal" downlink software routines when the system is operating in the "normal" mode (block 622), and executes failsoft downlink software routines when the system is operating in the failsoft mode (block 624).

In the preferred embodiment, memory 504 of each trunking card stores a copy of the normal and failsoft control channel software routines, normal and failsoft working channel software routines, and normal and failsoft downlink software routines (even though only the one control channel trunking card actually executes the control channel routines and only the downlink trunking card executes the downlink routines).

Figure 11:
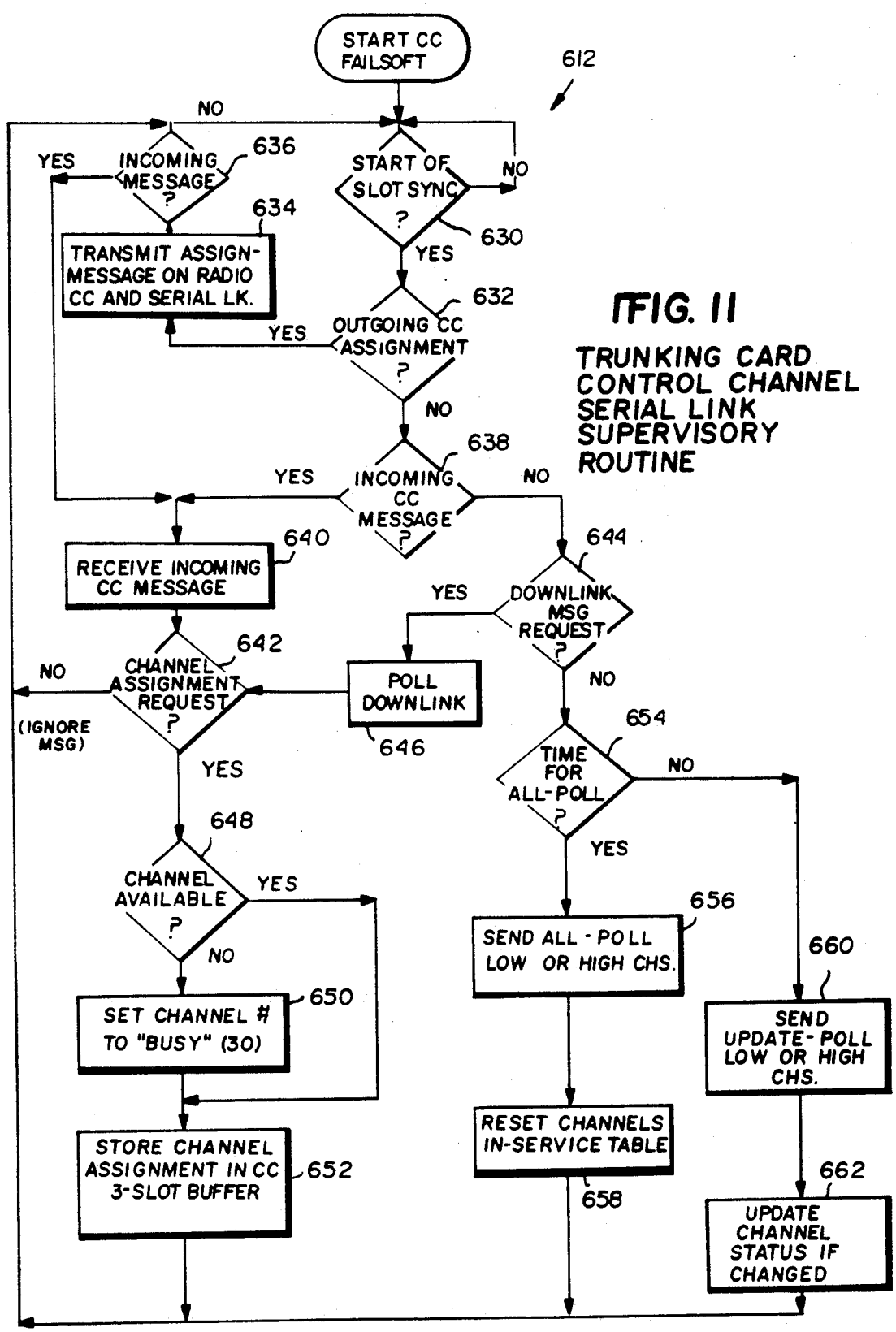

FIG. 11 is a flowchart of exemplary program control steps included in the failsoft control channel software routine of FIG. 10 block 612. The control channel trunking card waits for the beginning of a control channel frame (decision block 630)—control channel frame timing being controlled by a conventional software or hardware oscillator or timer circuit included onboard the control channel trunking card. When the beginning of the next control channel slot (frame) occurs, the control channel trunking card determines whether it is required to generate a channel assignment message in response to a channel request message received during the last slot (decision block 632). If a channel assignment message is to be generated, the control channel trunking card controls its associated repeater transmitter to transmit the assignment message on the outbound control channel, and also applies the channel assignment message to the BSL (block 634; see FIGS. 6A and 9). The control channel trunking card then tests whether an incoming message is being received (decision block 636). After transmitting a channel assignment message, the control channel trunking card simply waits for the start of the next control channel slot—since the current slot is nearly over by the time the channel assignment message terminates (in the preferred embodiment, a three-slot delay is introduced between receipt of a channel request message and transmission of a channel assignment message to give the site controller time to process the channel request—and this three-slot delay is preserved in the fail soft mode to preserve system timing).

If a control channel message is coming in from a mobile unit (decision block 636, 638), the control channel trunking card receives the incoming control message (block 640) and determines whether it is a channel assignment request message (decision block 642). Only individual, group or emergency channel assignment request messages are handled by the control channel trunking card during failsoft mode—all other inbound control channel messages being ignored.

If there is no incoming control channel message, the control channel trunking card tests whether the downlink trunking card has a console message to place on the BSL (by simply testing the last poll response) (decision block 644). If the downlink trunking card does have a console message to place on the BSL, the control channel trunking card generates a downlink poll (block 646; see FIGS. 6B and 8), receives the message placed on the BSL by the downlink trunking channel in response to the downlink poll (block 646) and then determines whether the console message is a channel assignment request (decision block 642) (the control channel trunking card ignoring console unkey messages).

If either the console or a mobile unit has requested a channel assignment (tested for by decision block 642), the control channel trunking card determines whether a channel is available for assignment by testing a channel assignment table it stores within its memory 504 and constantly updates with poll responses during the failsoft mode (and with channel allocation information provided to it by site controller 410 over its dedicated RS232 parallel signal path during the normal mode so that the trunking card already has current status and channel allocation information stored within it in the event switchover to failsoft mode is necessary). If a channel is not available (decision block 648), an internal flag is set so that the channel assignment message to be generated by block 634 during the next control channel slot will indicate in its channel field (see FIG. 6A) that all channels are busy (block 650). If a channel is available for assignment, the control channel trunking card stores the channel assignment in an internal buffer it uses to construct the channel assignment message shown in FIG. 6A (block 652) in preparation for transmitting the channel assignment message during the next control channel slot (block 634). Control then returns to decision block 630 to wait for the next control channel slot.

If no outgoing channel assignment message needs to be generated during the current control channel slot, there is no incoming control channel message, and the downlink trunking card has not received a console message, the control channel trunking card determines whether it is time for an all-poll message to be generated (block 654) (e.g., by testing the value of an internal timer to see whether two seconds or so has passed since the last all-poll message was generated). If it is time for an all-poll message, the control channel trunking card applies an all-poll message (to either the low or high channels) to the BSL (block 656), looks for the response to the all-poll message, and updates an "in-service" table stored in the control channel trunking card memory 504 which is used to indicate which channels are operational and which channels are not in service (block 658). The control channel trunking card considers all trunking cards which do not respond to an all-poll message to be non-operational and does not attempt to assign their associated channels as working channels. However, it a trunking card which previously fails to respond to an all-poll message begins once again responding to such messages, the control channel trunking card updates its in-service table to indicate that the channel associated with it is once again operational.

If decision block 654 determines that it is not yet time for an all-poll message, the control channel trunking card generates an update poll message to either the low or the high channels (in the preferred embodiment, update poll messages are alternately generated to the low and high channels) (block 660), decodes any responses to the update poll message, and updates its channel assignment table (stored in its memory 504) to reflect the current status of any channels which have been assigned or released since the last all poll or update poll message was generated (block 662).

Figure 12:
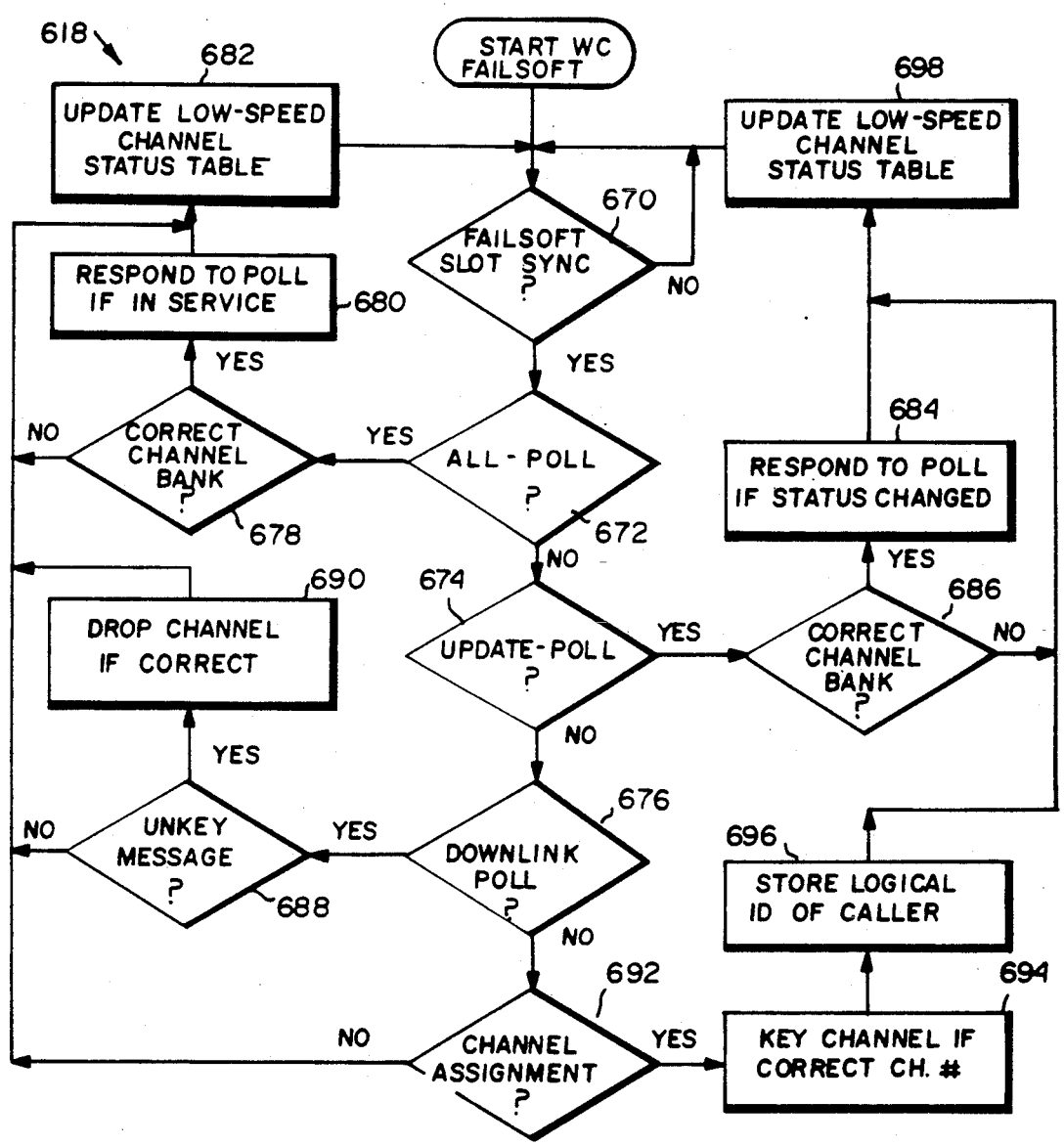

FIG. 12 is a flowchart of exemplary program control steps performed by working channel trunking cards when system 100 is operating in the failsoft mode (block 618, FIG. 10). The working channel trunking card waits for the next sync pulse on sync line 520, and then looks for a poll message on the BSL (blocks 672, 674, 676). If an all-poll message is present, the working channel trunking card determines whether the all-poll message is directed to it (e.g., if the message is directed to channels 13-24 and a working channel trunking card is associated with channel 11, it need not respond to the all-poll message (decision block 678). If an all-poll message directed to the working channel trunking card is received, the working channel trunking card responds to the poll (block 680). And at the same time, the working channel trunking card analyzes responses generated by other trunking cards and updates an internal "in-service" channel status table accordingly (block 682). In the preferred embodiment, system status information (e.g., whether the system is in normal or failsoft mode, which channels are assigned, and which channels are in service) is continuously transmitted over the active working channels along with other information so as to update mobile units active on the working channel of current system status. Hence, in the preferred embodiment, all trunking cards (not just the control channel trunking card) maintains an in-service table and a channel assignment table.

If the working channel trunking card determines an update poll message has been generated by the control channel trunking card (block 674), it responds to the update poll message if its status has changed since the last update poll or all-poll message directed to it so long as the update poll message is directed to the channel bank it is a member of (blocks 684, 686).

If the control channel trunking card has generated a downlink poll message, no response is required by the working channel trunking card, since the downlink trunking card is the only trunking card which responds to downlink polls. However, the downlink trunking card may be applying a console-generating unkey message instructing the working channel to drop channel. Accordingly, all working channel trunking cards monitor downlink poll responses, and if the downlink responds with a message instructing the working channel trunking card to drop its channel, the working channel trunking card controls its repeater transmitter to transmit a dotting string and then stop transmitting altogether (decision block 688, block 690).

Finally, if the control channel trunking card has generated a channel assignment message during the current control channel slot (as tested for by decision block 692), the working channel trunking card controls its associated repeater transmitter to begin transmitting if the channel assignment message selects the working channel trunking card (block 694); stores the logical identification of the caller in its memory 504 (block 696), and continues to supervise the operations of the associated working channel repeater transmitter and receiver for the duration of the call. The working channel trunking card updates its channel status table after all operations it performs, and then waits for the beginning of the next control channel slot (blocks 698, 682, 670).

Figure 13:
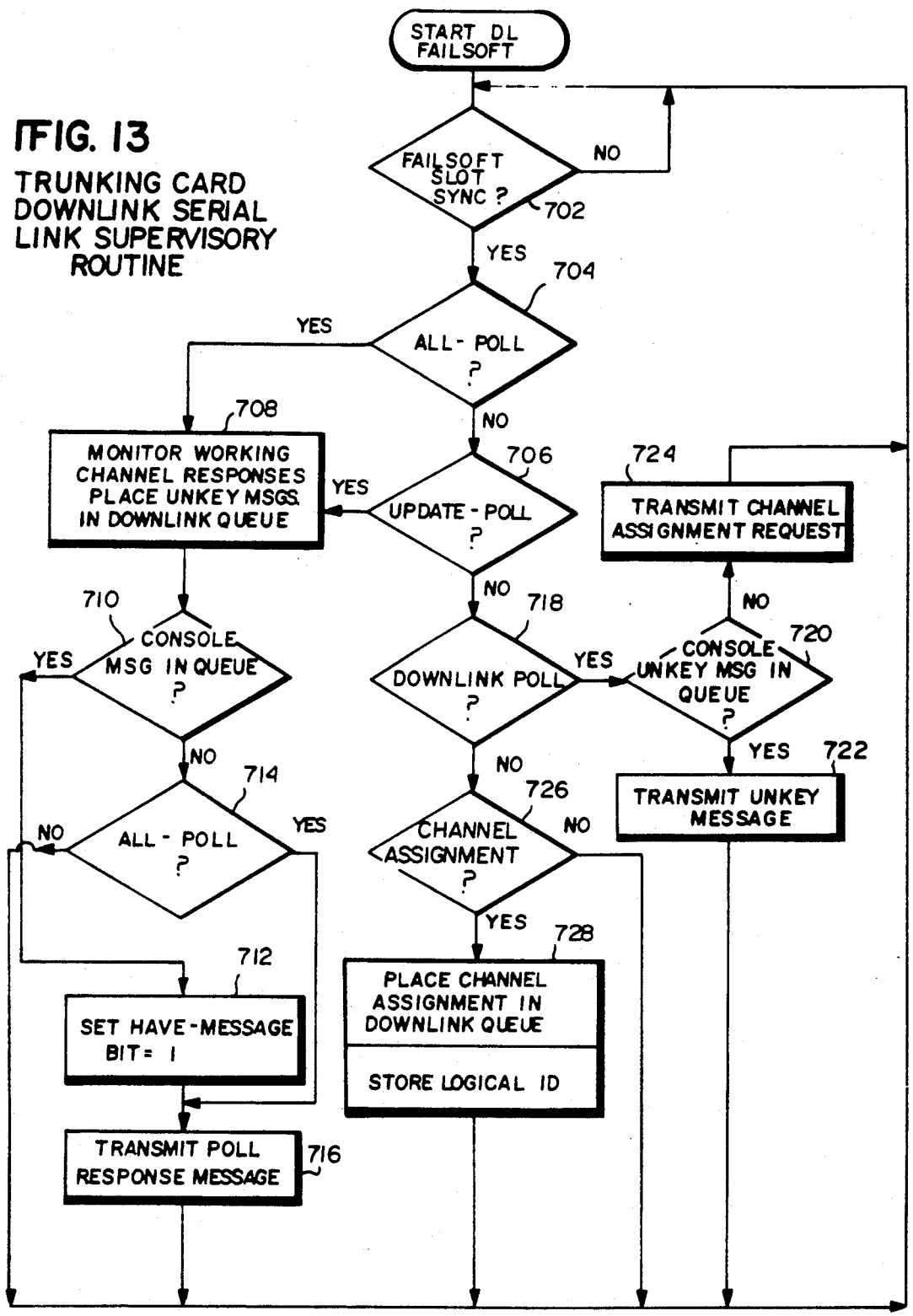

FIG. 13 is a flowchart of exemplary program steps performed by the downlink trunking card when system 100 is in failsoft mode (see FIG. 10, block 624). The downlink trunking card waits for the beginning of the next control channel slot (decision block 702), and then determines whether the control channel trunking card has placed an all poll or an update poll message on the BSL (decision blocks 704, 706). If a poll message is generated by the control channel trunking card, the downlink trunking card monitors the responses to the poll message generated by the various working channels, and informs the console of all status changes (e.g., working channels that were assigned but have now been released). In the preferred embodiment, the downlink trunking card maintains a first in first out queue in its memory 504 so that several messages intended for the console can be temporarily stored until the console has a chance to receive and analyze the messages (block 708).

The downlink trunking card also maintains an inbound queue containing channel request and unkey messages generated by the console. If there is a console message in the inbound queue (as tested for by decision block 710), the downlink trunking card responds to the control channel trunking card poll message (regardless of whether the poll message is an all poll or an update poll message and regardless of which bank of channels the poll message is directed to) with an indication that there is a console message to be placed on the BSL (block 712; see FIG. 6C). In the case of an all-poll message, the downlink trunking card responds indicating that it is operational (decision block 714, block 716) even if there is no console message to be placed on the BSL.

If the control channel trunking card generates a downlink poll message (decision block 718), the downlink trunking card scans its inbound queue to determine whether there are any unkey messages stored there (unkey messages have a higher priority than channel assignment request messages in the preferred embodiment) (block 720). If a console-originated unkey message is stored in the queue, the downlink trunking card generates a channel unkey message and applies it to the BSL (see FIG. 6E) (block 722). If a channel assignment request message originated by the console is stored in the queue, the downlink trunking card generates a downlink channel request message (see FIG. 6D) and applies this message to the BSL (block 724).

If the control channel trunking card has generated a channel assignment message rather than a poll message (as tested for by decision block 726), the downlink trunking card monitors the channel assignment request message and communicates its contents to the console via the downlink queue, and also stores the logical ID of the called individual or group (block 728).

FIGS. 21–23 are timing diagrams of exemplary signals transmitted and received by system 100 during operation of the system in the failsoft mode. These signalling sequences and timings are basically identical to those generated by the system during normal operation (as described in commonly-assigned U.S. patent application Ser. No. 056,922, filed Jun. 3, 1987 of Childress et al, entitled, "Trunked Radio Repeater System" now U.S. Pat. No. 4,905,302). Generally, users of the mobile units communicating with system 100 discern no difference in the operation of the system between normal and failsoft modes. Special calling functions are not supported in the failsoft mode, so a special call request generated by a mobile unit will be ignored. The subaudible status information constantly being transmitted by system 100 over the control and working channels referably includes a bit indicating that system 100 is in failsoft so that users do not initiate special calls during failsoft operation (or the mobile units may themselves have intelligence which inhibits all but individual, group and emergency calls from being initiated when the system is in the failsoft mode).

Figure 14:
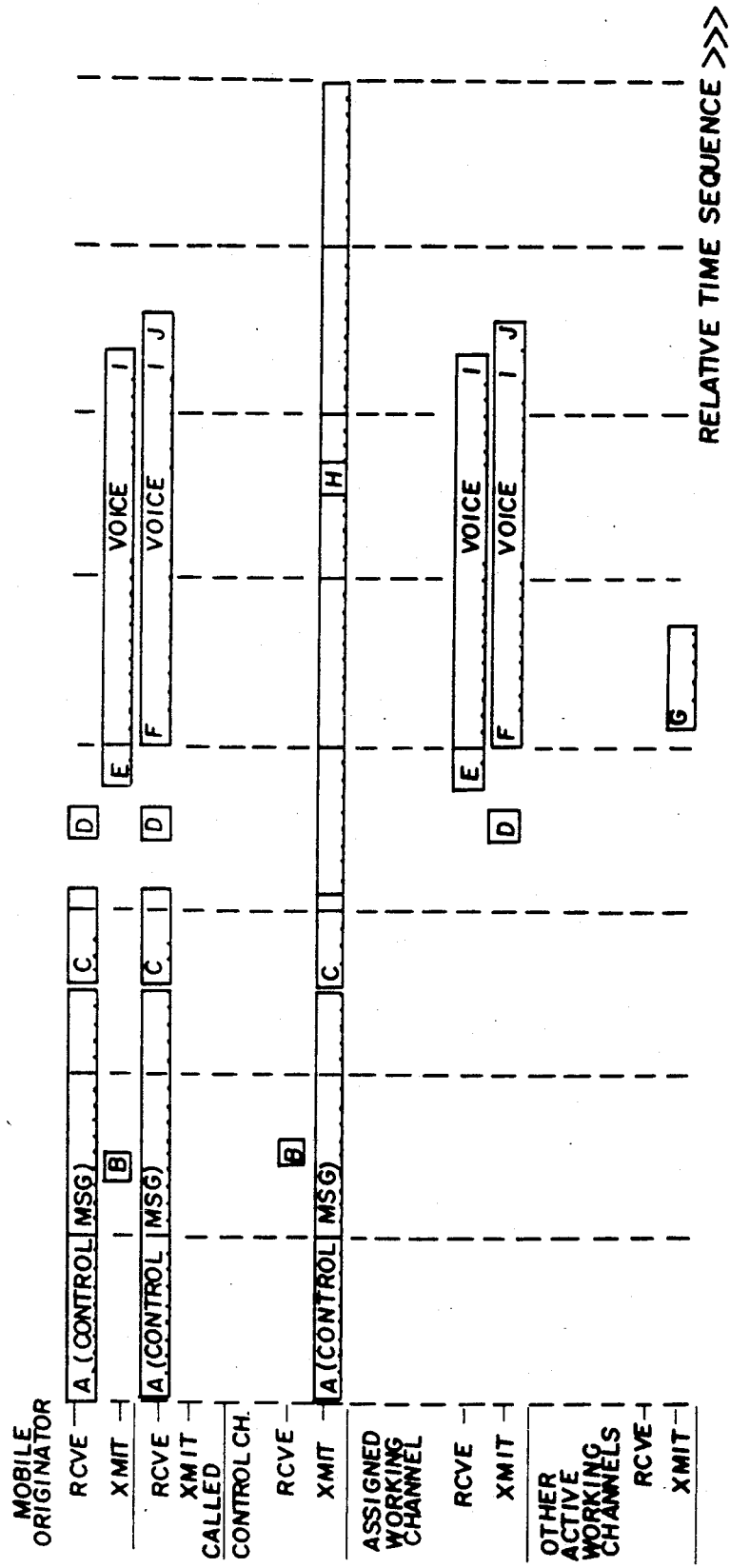
FIGS. 14, 15 and 16 are schematic diagrams of exemplary signalling messages passed back and forth between control and working channel repeater stations of the FIG. 2 system, control console 102, and mobile units during origination of an individual call by a mobile unit, an individual call by a control console, and an emergency group call by a mobile unit, respectively, during failsoft operation.

FIG. 14 shows the signals generated by system 100 during the failsoft mode of operation when the mobile unit originates a call to another individual mobile unit. At A, the control channel trunking card controls its associated repeater transmitter to transmit a continuous stream of control messages which all inactive mobiles monitor and receive. During this time, if no incoming control channel radio messages are detected by the control channel trunking card during a control frame, the control channel trunking card polls the working and downlink trunking cards via the BSL beginning approximately 20 milliseconds after the beginning of the control channel frame. Up to twelve working channel trunking cards and the downlink trunking card respond with status information, allowing the control channel trunking card to keep track of the activity of the various channels and the need to collect console messages stored by the downlink trunking channel.

At B, a mobile unit that wishes to originate an individual call transmits an assignment request message on the control channel in synchronism with the received control channel messages. The individual call assignment request message indicates the logical ID of the called and calling mobile units, along with other information. During normal operation of system 100, the control channel trunking card merely passes this request message up to the primary site controller 410. However, during failsoft operation, the control channel trunking card itself responds with a channel assignment two-message pair transmitted on the outbound control channel at C, and also sends a channel assignment message to the working channel trunking cards and the downlink trunking card over the BSL.

The selected working channel trunking card processes the new call beginning at D by transmitting the confirmation message. The originating mobile (which has by this time moved to the working channel frequency in response to the channel assignment message transmitted on the outbound control channel) receives a confirmation message transmitted on the working channel, and transmits 384 bits of dotting and then audio beginning at E. At F, the working channel trunking card receives the dotting transmitted by the mobile and transmits unit-key/unmute messages to control the mobile unit to unmute its audio. Meanwhile, all working channel trunking cards update their channel assignment tables to reflect the new channel assignment, and this updated information is transmitted over all active working channels in subaudible messages at G. The downlink trunking card receives the channel assignment message over the BSL also, and informs the console of the channel assignment.

At I, the transmitting mobile unkeys and sends a non-slotted unkey message to the working channel receiver. In response, the working channel trunking card controls its associated transmitter to transmit 896 to 2816 bits of dotting, thereby dropping all mobile units from the channel. At this point in time, the working channel trunking card has autonomously released the working channel. The working channel trunking card responds to the next control channel polling message with its unassigned status, and the control channel trunking card (as well as all of the other working channel trunking cards) updates its channel assignment table to reflect the release of this working channel. The downlink trunking card monitors the working channel trunking card poll response, and sends an unkey message to the console to indicate that the conversation has been discontinued.

Figure 15:
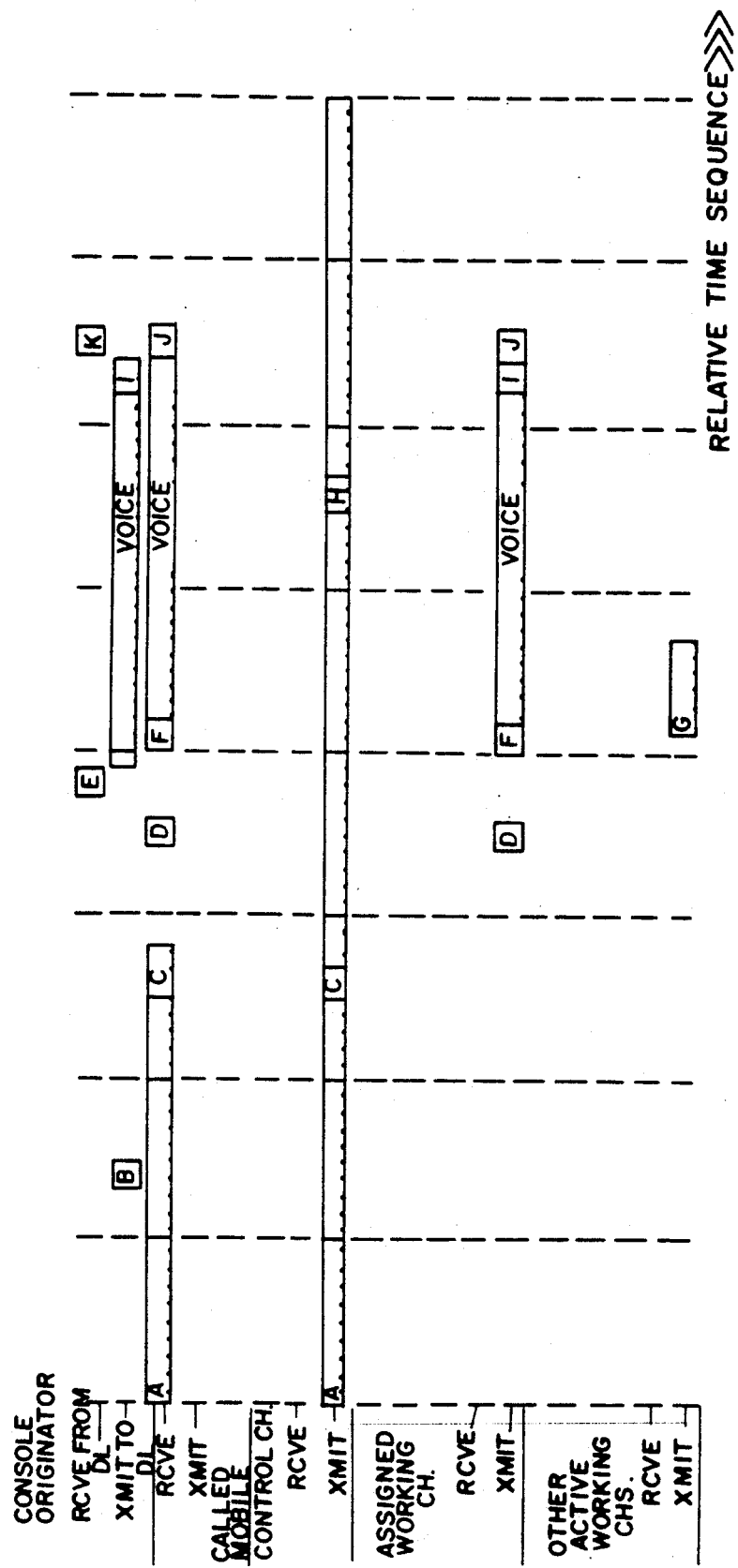

FIG. 15 is a schematic diagram of exemplary signal timing of signals occurring in response to origination by the console of a call to an individual mobile unit. At A, the control channel transmits a continuous stream of control messages which all inactive mobile units receive, and if no incoming control channel radio messages are detected by the control channel trunking card, the control channel trunking card polls the other trunking cards. At B, the console wishing to originate an individual call communicates an individual call message to the downlink trunking card. During the normal mode of operation of system 100, the downlink trunking card would simply pass this individual call message on to primary site controller 410 for proper handling. However, in the failsoft mode of operation, the downlink trunking card responds to the next poll generated by the control channel trunking card with a poll response indicating the need for a downlink poll. The control channel trunking card then generates a downlink poll, and the downlink trunking card sends a call request message to the control channel trunking card over the BSL. At C, the control channel trunking card generates a channel assignment message, transmits this message on the outbound control channel, and also applies the message to the BSL to control the assigned working channel trunking card to begin handling the new call. The selected working channel trunking card activates its associated transmitter, all other working channel trunking cards update their channel assignment tables accordingly, and the downlink trunking card informs the console that a channel assignment has been made.

In response to receipt of the outbound control channel assignment message, the called mobile unit switches to the assigned working channel and receives a confirmation message on the working channel at D. When the conversation has terminated, console sends an unkey message to the downlink trunking card at I.

In response to the next control channel trunking card-generated poll, the downlink trunking card indicates the need for a downlink poll, which the control channel trunking card typically generates almost immediately. In response to the downlink poll, the downlink trunking card applies the console unkey message to the BSL, which is monitored by all working channels trunking cards—including the working channel trunking card handling the working channel to be dropped. At J, the working channel trunking card transmits 896 to 2816 bits of dotting to drop all mobile units from the channel. In response to the next control channel trunking card polling message, the working channel trunking card responds with its unassigned status. The downlink trunking card decodes the poll response message, and sends a message to the console confirming that the working channel has been dropped.

Group calls originated by mobile units and the console cause system 100 to generate signalling which is essentially identical to that shown in FIGS. 14 and 15, the principal difference being that all mobile units of a call group rather than an individual mobile unit switch to the assigned working channel at D and receive a confirmation message. The control channel trunking card maintains within its memory 504 a list of individuals and groups of mobile units that have already been assigned to a channel, and responds to a mobile unit-originated call to a group that has already been assigned to a channel by generating individual call signals on the outbound control channel which direct the calling mobile unit to join the group conversation already occurring on the active working channel.

Figure 16:
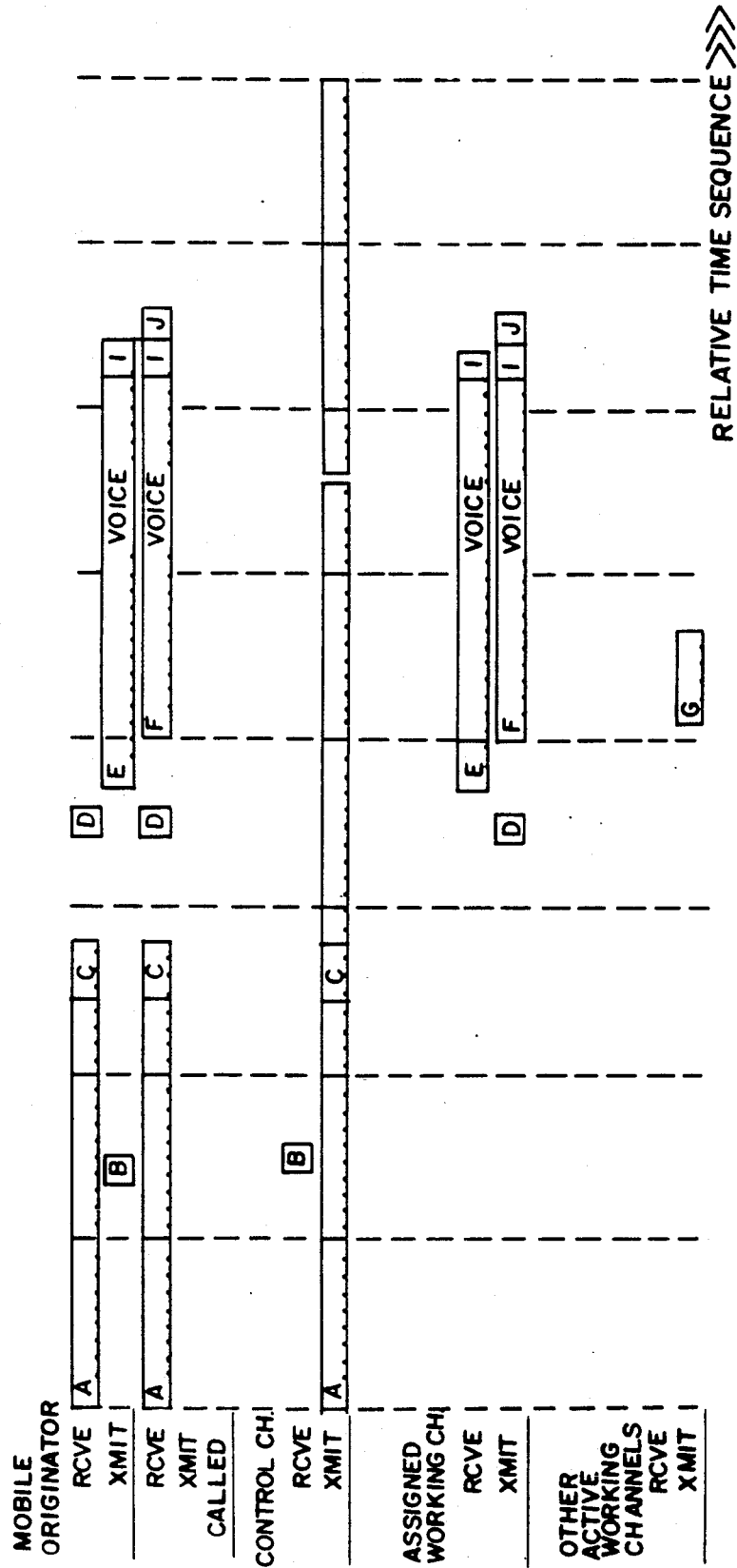

FIG. 16 is a schematic diagram of exemplary signalling occurring during the failsoft mode in response to an emergency group call initiated by a mobile unit. At A, the control channel trunking card causes its associated control repeater transmitter to transmit a continuous stream of control messages which all inactive mobiles receive, and meanwhile performs routine polling functions. The mobile unit wishing to originate an emergency group call transmits an assignment request message on the inbound control channel in synchronism with the received control channel messages at B. The control channel trunking card responds by causing its associated transmitter to transmit a channel assignment message designating the called group and also by placing the channel assignment message on the BSL at C.

All mobile units within the called group immediately switch to the assigned working channel, and the assigned working channel trunking card keys in response to the channel assignment message carried by the BSL. Handshaking occurs at D, E and F. At G, active mobile units on other working channels receive subaudible channel assignment messages updating them on the status of system 100. When a transmitting mobile unit unkeys, it sends a unkey message at I. The working channel trunking card times a hang time delay period after the transmitting mobile unit unkeys—thus maintaining the channel assignment to the emergency call. When the hang time expires, the working channel transmits dotting at J to cause the mobile units to drop from the working channel back to the control channel, and then unkeys its transmitter. In response to the next poll from the control channel trunking card, the working channel trunking card responds with its unassigned status which is used to update channel assignment tables within the control channel trunking card and the other working channel trunking cards, and is also used by the downlink trunking card to inform the console that the working channel is no longer assigned.

FAULT TOLERANCE EVALUATION

Figure 17:
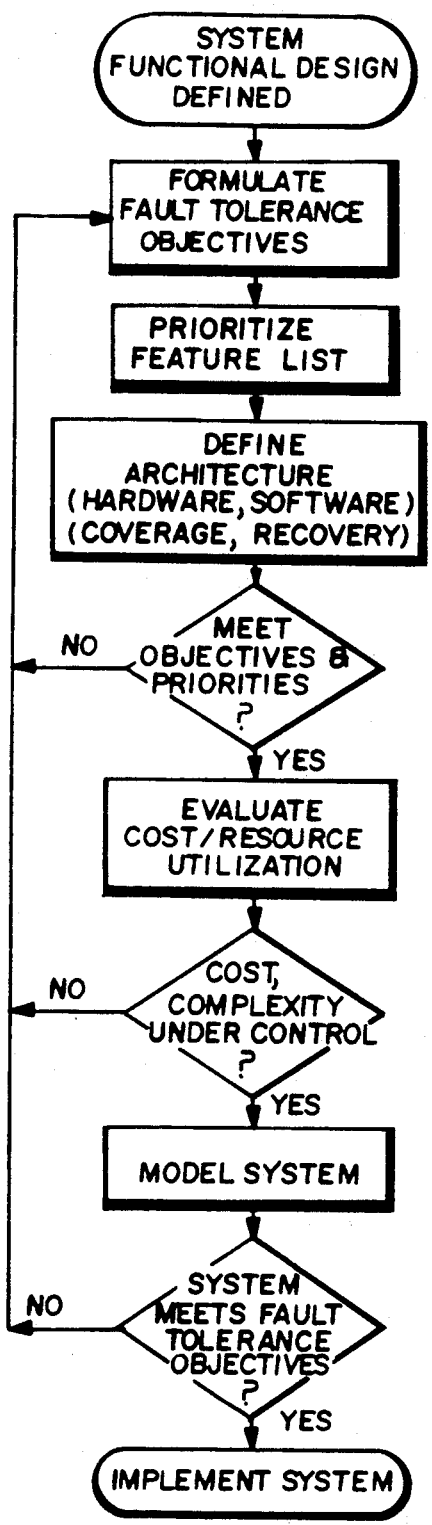
FIG. 17 is a flowchart of exemplary steps to be taken to design a fault tolerant system.

Following the initial system functional specification, five steps, executed as an interactive process, can be used for designing the system to be fault tolerant. These are shown as a flowchart in FIG. 17. The goal in the next few pages is to highlight the breadth and depth of the decisions required at each stage.

Step No. 1: Fault Tolerance Objectives

Initially a fault tolerance specification is developed. This provides an objective measurement for assessing when the design is complete. More importantly, it aids the end user in anticipating financial, managerial and personnel resources needed for maintaining and supporting the system, as well as highlighting necessary service contracts, the various modes of operation induced by failures, and the need for communication contingency plans for various emergencies. Examples of specific parts of the specification are:

(Fault) Coverage

Two fault tolerance definitions exist for this term (neither to be confused with RF coverage). Coverage is a number between 0 and 1 which indicates what percentage of errors can be automatically detected (first definition) and then automatically circumvented via reconfiguration (second definition). The first definition is clearly a procedural subset of the second, and is preferred since what constitutes successfully automatically circumvented via reconfiguration can be vague. The advent of microprocessors and computers have made coverage figures of 90% easily achievable and coverage figures of 95% achievable with reasonable engineering design efforts. Figures in excess of 99% are achievable, but are significant engineering undertakings. One should note that coverage figures are difficult to substantiate and that dual redundancy usually offers poor fault coverage, particularly when dealing with computers.

Redundancy vs Graceful Degradation

Some applications require complete redundancy, although most can take advantage of "graceful degradation." The former offers little additional benefits to the end user while committing capital for computer and/or other equipment which sit idle waiting for a failure. Typically one is willing to give up some, but not all, features when a failure occurs in order to invest the otherwise spent capital in other areas (e.g., radios).

Failure Modes

Failures will force a system into a variety of modes. It is important that "acceptable" failure modes truly be appropriate to the application. For example, converting an airplane at 35,000 feet to a bus should an engine fail is an obvious mismatch (doing so on the ground is, of course, acceptable). A more subtle mismatch is converting a fully loaded trunked system to an overloaded conventional one just because one computer has failed.

MTBF—Mean Time Between Failures

This is the average length of time, given that the system is functional, that the system will continue to function. Various MTBF figures can be significant, depending on the characteristics of the different modes of operation of the system (e.g., the MTBF of individual components, the MTBF of the system where a failure is considered to be losing at least ½ of the channels, or the MTBF of the system's trunking capability).

MTTR—Mean Time to Repair

This is the average length of time, given a failure has occurred, that it will take to repair the failure. As with MTBF, there are various figures of interest, ranging from the MTTR of individual components to MTTR of channels, to MTTR of computers, or even to MTTR of various features.

Step No. 2: Feature Prioritization

Both system design by the vendor and system selection by a procuring agency should consider the communications problems being addressed in order to prioritize the various functions performed by the system. Some functions are absolutely critical, others are highly desirable while still others serve as conveniences. By ranking the various features, graceful degradation of the system can be designed. In fact, this step is the key for matching failure modes with their targeted end use in the field.

An obvious example is a 20 channel system with a failure of the control logic on one of the channels. In this case, trunking is more important than the one channel, so the end user would rather run 19 channels trunked as opposed to switching to a 20 channel conventional failsoft mode.

In a trunked communication system, the priority tends to be on reliable, efficient communications without changing the mode of operation for the users. This means a system designed to go into a conventional failsoft mode is less desirable than a system which simply loses features (e.g., interconnect and dynamic regrouping), but maintains trunking with no noticeable change to the end user. The former ignores user needs so as to simplify the engineering effort by placing the burden on the end user. The latter observes the end users needs, though it creates a more challenging engineering problem by placing the burden on the system designers.

An exemplary list of desirable feature priorities is as follows:
1) mobile-mobile communications
2) dispatch console operation
3) trunking (full speed access)
4) priority scan
5) channel logic diagnostics
6) call queueing
7) dynamic regrouping
8) patch
9) interconnect
10) background diagnostics
11) user validation

Step No. 3: Architecture Definition

Defining a fault tolerant architecture adds another layer of considerations to the design task. Functionality, modularity, hardware/software trade-offs and implementability are still prime considerations. But now one must also consider interdependence, functionality distribution, redundancy, and coverage/recovery algorithms. These additional problem elements significantly increase system complexity and processor loading.

One of the results of sound architecture design is modularity. This is also the case in fault tolerant design, except marrying functional modularity with hardware and software modularity becomes even more important. The goal is to minimize interdependencies between various system modules, and to minimize the number of hardware modules needed for any particular feature. This will minimize the probability that the feature is lost when a failure occurs and maximize the probability of success of the reconfiguration process. Similarly, reducing "common" hardware minimizes the likelihood that single point failures will cause the entire system to cease operating.

Although hardware and software are usually considered separately, they are very interdependent in a fault tolerant design. The distinction between the "hardware architecture" and the "software structure" becomes blurred at the system level (in evaluating a system, neither should be considered without understanding the trade-offs made between the two).

Nevertheless, one specific software issue should be highlighted: Software modularity is extremely important. In a fault tolerant system, reconfiguration capabilities are achieved by having various hardware modules support similar functionality. Consequently, software modularity assures greater code simplicity, predictability, and reliability by forcing a single version of software to exist for any particular function.

Error propagation is another consideration. When a failure in the system occurs, it is possible for it to spread (e.g., a failed component on a computer bus can cause the entire computer to cease operating). In a trunked system, this further suggests modularity and distributed processing— discouraging the placement of all control functions on a single bus computer.

Particularly in a trunking system, all these considerations suggest placing channel signalling and control at each channel with overall site control in a site controller. This lets each channel be an autonomous unit, offering both feature benefits as well as significant reconfiguration capabilities. It also removes signal processing loading from the site controller, which can then be a general purpose computer, enabling the use of off-the-shelf hardware, multi-tasking operating systems, and high level languages. These, in turn, offer greater software and hardware reliability.

The next architectural consideration is that of coverage. The purpose of coverage is to detect failed modules so that they can be removed from service. Coverage should be achieved via both intra-module (self-diagnostics) and inter-module diagnostic algorithms. Inter-module testing of control module "sanity" should employ only the existing hardware interfaces, and not extra hardware. On the other hand, inter-module testing of non-control functionality, such as RF, often will require specific hardware.

In a trunked system, diagnostics should have a negligible effect on site controller loading. As more loading is caused by performing diagnostic functions, less processing can be used to offer end user features. This is another reason why do-it-all custom controllers can be inappropriate. In the preferred embodiment, the monitoring of diagnostic peripherals, and all other diagnostic functions, are conducted via background software routines through standard RS-232C interfaces interconnecting hardware blocks. The real-time monitoring is effectively off-loaded from the site controller and only incurs processor loading if a fault is detected or if the site controller has nothing else to do.

An integral part of coverage design involves ranking failures based on both their likelihood of occurrence and their consequences. This is followed by designing algorithms for detecting the most probable failures. Complete coverage of any, let alone all, modules is impossible. Nevertheless, the coverage relative to the probability of failure of each hardware and software component should be estimated and the results used in evaluating the appropriateness of the given architecture. This involves maximizing coverage for the most likely failures, but also considering the consequences of failing to detect certain failures when they occur. At this point the necessary reconfiguration algorithms and their resultant complexity must also be considered, for even perfect coverage is useless if the system cannot reconfigure from the failure.

In a trunked system, besides RF failures, the most likely failure is the site controller or its peripherals. In the preferred embodiment, should the failure of a peripheral go undetected, its consequences are minimized (since its hardware is not lumped into the same box as the heart of the system). As an additional precaution, any peripheral failure of misdiagnosis that could result in severe consequences if undetected has an alternate path for verification on the part of the site controller. The same is true for channel logic card failures. There are a multitude of other processors observing the site controller. Since these processors can behave autonomously, an incorrect diagnosis of the site controller by one of the processors only affects the processor and not the rest of the system.

Recovery is the culmination of the architecture definition. This is where the goals of Step No. 1, the priorities of Step No. 2, the functionality overlap among system modules, and the coverage all come into play. System operational modes must be defined and detailed as to what features/functions are available under the various fault reconfiguration modes. Once the various modes are defined, the transitions between the modes must be determined. This usually requires intermediate states. All states (technically, each operational mode is considered a state) must be carefully examined and defined at this point. It is imperative that oscillatory behavior of state transitions be avoided, and that when a module diagnoses itself or another module as bad, its decision only affects itself.

A methodology must exist for verifying the coverage and reconfiguration process. This is the appropriate time to develop those test procedures.

The preferred embodiment is an excellent solution for a fault tolerant trunked system. Channel failures can be detected from three paths (the site controller, an RF monitor unit which monitors repeater outputs in a multiplexed fashion, and a test unit which is capable of independently testing the operation of each of the trunking cards without significantly loading or depending upon the site controller). Failures of peripherals remain local to the peripheral and only the functionality of the failed peripheral is lost. Should the downlink fail (this is the interconnection between the site and the dispatch center), a channel can be removed from service and used as the downlink (as opposed to paying monthly for the unused, redundant phone line). Should the site controller fail, trunking control is assumed by the repeater control cards Trunking continues and users perceive no difference in channel access time. Even if additional channel logic fails after the site controller has failed the system will continue to reconfigure.

Step No. 4: Cost/Resource Utilization

It is now time to determine whether the system is still affordable, and whether some of the design objectives established earlier are really worth the cost. A well engineered fault tolerant system has little, if any, idle hardware whose sole purpose is to achieve redundancy. Expensive, idle hardware suggests either the initial design is inadequate, or possibly the design constraints are too demanding. Should the fault tolerance capabilities appear to be too costly, further architecture design efforts and strategic relaxation of the design objectives of Step No. 1 can be expended.

The architecture should be examined in light of the feature priorization established in Step No. 2. Do the reconfiguration modes, with their relative probabilities of occurrence, truly adhere to the design criteria suggested by the list? Is the prioritization list itself realistic with the additional understanding obtained during the design process? Clearly the design process becomes an iterative one at this point.

The architecture's complexity should be examined to determine if risk or feasibility issues exist. Measuring complexity can be difficult. Block diagrams, state diagrams and flowcharts can be over-simplified by lumping complex issues into single blocks, combining states, and highlighting extraneous details. They also fail to represent the relationship between the probability of a failure and the degree to which the system can detect it and successfully reconfigure. Without Markov modeling, reliability claims are virtually impossible to verify and reconfiguration is far from trustworthy.

Step No. 5: Modeling

The system may be modeled to determine whether it meets the fault tolerance objectives selected in Step No. 1. Markov chains are an excellent tool, providing MTBF and MTTR figures as well as providing the probabilities of the system being in each of its possible states. It is based on the following (1) Component failures are modeled with an exponential probability distribution. This ignores infant mortality rates, but if equipment is burned in it proves to be an excellent model.

(2) Failure rates for an aggregate of parts are also exponentially distributed since $\exp(A) * \exp(B) = \exp(A+B)$. The failure rate can either be calculated using military handbooks for the individual components making up the assembly, or can be determined by conducting life tests.

(3) P(failure in time interval t, $t+T$) = $\exp(-/T)$. This will be approximated as simply $/T$ with no loss of accuracy in the final result.

(4) Theorem: Every finite state irreducible aperiodic Markov chain has a limiting distribution. This limiting distribution is the only equilibrium distribution.

(5) At equilibrium—P(being in state k at time t) is the same as P(being in state k at time $t+T$).

(6) It can be shown that the steady state solution is the worst case MTBF figure (it gives the highest failure rate possible given the system is working at time $t=0$).

(7) The sum of the probabilities of exiting a state must equal one (including the probability that a state exists itself in order to return to itself).

(8) The sum of the probabilities of all states equals one.

(9) The MTBF of the system is the reciprocal of its failure rate.

(10) Operational states are states in which the system is available (e.g., trunked). Non-operational states are states in which the system is not available.

(11) The failure rate for the system is the sum of the probabilities of entering a non-operational state from any operational one. See below:

$$\lambda_{System} = \frac{1}{P_{av}} \sum_{j}^{\text{Oper States}} \left( P_j \sum_{k}^{\text{Fail to Non-op}} \lambda_k \right)$$

Figure 18:
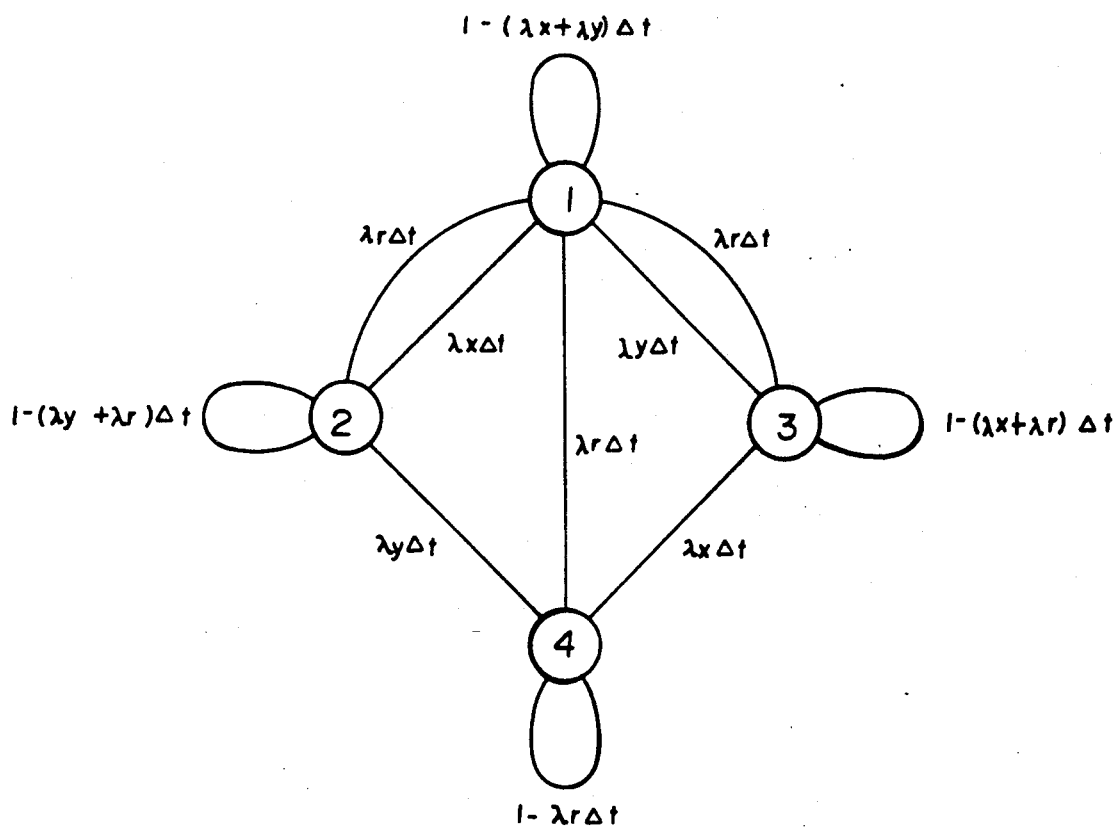
FIG. 18 is a schematic diagram of a two module Markov model of the system of the present invention.

With these eleven facts, a Markov model can be constructed and a solution found using linear algebra. A two-module example is shown in FIG. 18.

Modules "x" and "y" each have different failure rates and identical repair rates. Given any small interval in time, the probabilities of changing to various states are shown with arrows. The steps in solving for the probabilities of being in each of the four states are shown below:

Two Module Markov Model

From the model, derive the matrix:

$$\begin{bmatrix} P_1(t + \Delta t) \\ P_2(t + \Delta t) \\ P_3(t + \Delta t) \\ P_4(t + \Delta t) \end{bmatrix} =$$

$$\begin{bmatrix} 1 - (\lambda_x + \lambda_r)\Delta t & \lambda_r\Delta t & \lambda_r\Delta t & \lambda_r\Delta t \\ \lambda_x\Delta t & 1 - (\lambda_k + \lambda_r)\Delta t & 0 & 0 \\ \lambda_y\Delta t & 0 & 1 - (\lambda_k + \lambda_r)\Delta t & 0 \\ 0 & \lambda_y\Delta t & \lambda_k\Delta t & 1 - \lambda_r\Delta t \end{bmatrix} \begin{bmatrix} P_1(t) \\ P_2(t) \\ P_3(t) \\ P_4(t) \end{bmatrix}$$

Now perform these steps:
1) Rearrange terms
2) Divide by $\Delta t$
3) Include $\sum_{n=1}^{4} P_n(t) = 1$ 4) Include the fact that $\lim_{\Delta t = 0} \frac{P_n(t + \Delta t) - P_n(t)}{\Delta t} = 0$ $$\begin{bmatrix} 1 \\ 0 \\ 0 \\ 0 \\ 0 \end{bmatrix} = \begin{bmatrix} 1 & 1 & 1 & 1 \\ -(\lambda_k + \lambda_r) & \lambda_r & \lambda_r & \lambda_r \\ \lambda_y & -(\lambda_k + \lambda_r) & 0 & 0 \\ \lambda_y & 0 & -(\lambda_k + \lambda_r) & 0 \\ 0 & \lambda_y & \lambda_k & -\lambda_r \end{bmatrix} \begin{bmatrix} P_1(t) \\ P_2(t) \\ P_3(t) \\ P_4(t) \end{bmatrix}$$

Solving yields:

$$P_1 = \frac{\lambda_r}{\lambda_r + \lambda_k + \lambda_y}$$

$$P_2 = \frac{\lambda_k \lambda_r}{(\lambda_r + \lambda_k + \lambda_y)(\lambda_r + \lambda_y)}$$

$$P_3 = \frac{\lambda_y \lambda_r}{(\lambda_r + \lambda_k + \lambda_y)(\lambda_r + \lambda_y)}$$

$$P_4 = 1 - (P_1 + P_2 + P_3)$$

The interpretation of the states can be considered two different ways, as depicted below:

Serial Case (both modules needed):
$$P_{av} = P_1$$

$$\lambda_{System} = \frac{1}{P_{av}} (P_1(\lambda_k + \lambda_y)) = \lambda_k + \lambda_y$$

$$MTBF = \frac{1}{\lambda_k + \lambda_y}$$

Parallel Case (either module is sufficient for operation):
$$P_{av} = P_1 + P_2 + P_3$$

$$\lambda_{System} = \frac{1}{P_{av}} ((P_2\lambda_r) + (P_3\lambda_k))$$

$$MTBF = \frac{\lambda_r^2 + 2\lambda_r\lambda_k + 2\lambda_r\lambda_y + \lambda_k\lambda_y + \lambda_k^2 + \lambda_y^2}{\lambda_k\lambda_y(2\lambda_r + \lambda_k + \lambda_r)}$$

In the serial case the system requires both modules to be operational, meaning that state one is the only operational state. In the parallel case just one of the two modules is required for the system to be operational, meaning states one, two and three are operational states.

It is clear that for the serial case the failure rate should be the sum of the failure rates for the two modules. In fact, the model predicts exactly that. On the other hand, the failure rate for the parallel case is not so obvious, and if it were not for the model we would have no idea what the failure rate is.

Even this relatively simple model demonstrates how complicated the solution can become. Values for the various failure and repair rates can be substituted up front and an off-the-shelf conventional software package can be used to solve the simultaneous equations. If extensive modeling is to be performed, fairly sophisticated software packages are available for performing the complete reliability analysis.

To demonstrate the usefulness of Markov modeling, a ten channel version of the design depicted in FIG. 2 was modeled and compared to a non-fault tolerant design that uses a redundant site controller. The results shown below indicate it is three times more likely for trunking capability to be lost in the non-fault tolerant system with a redundant controller than for trunking capability to be lost in the fault tolerant system of the preferred embodiment.

|  | NON-FAULT TOLERANT | | FAULT TOLERANT |
| --- | --- | --- | --- |
| Redundant SC | NO | YES | NO |
| Trunking MTBF in years | 0.999 | 87 | 312 |
| P(failure) | | | |
| 10 years | 1.000 | 0.108 | 0.0315 |
| 20 years | 1.000 | 0.205 | 0.0621 |
| 30 years | 1.000 | 0.292 | 0.0917 |

Failure is defined as:
Loss of trunking
OR
Loss of more than 3 channels

ASSUMPTIONS:
Site controller MTBF = 1 year
Trunking card MTBF = 2 years
Stations MTBF = 1 year
MTTR = 48 hours NOTE:
A redundant site controller is optional in the Fault Tolerant Architecture.

While the present invention has been described with what is presently considered to be the most practical and preferred embodiments, it is to be understood that the appended claims are not to be limited to the disclosed embodiments but, on the contrary, are intended to cover modifications, variations and/or equivalent arrangements which retain to any of the novel features and advantages of this invention.

What is claimed is:

1. A fault tolerant trunked radio frequency (RF) repeater system including:

plural RF reporters each of which transmit and receive radio frequency signals carried over at least one corresponding RF frequency associated therewith;

plural trunking means each associated with a different one of said plural RF repeaters, said plural trunking means each for operating alternately in (a) a normal mode and (b) a fail soft mode, said trunking means each for cooperating with its associated corresponding RF repeater to effect RF signal transceiving in both said normal mode and said failsoft mode; and primary site controller means operatively connected to said plural trunking means for, in said normal mode, coordinating the operation of said respective plural trunking means so as to perform trunking control functions and thereby provide trunking of said RF frequencies corresponding to said plural RF repeaters;

said trunking means each communicating transceived control signals between said RF repeater associated therewith and said site controller means when operating in said normal mode, said trunking means each cooperating and communicating with others of said plural trunking means to perform trunking control functions in a distributed manner with the others of said plural trunking means, and communicating trunking control signals with the other trunking means when operating in said fail soft mode, wherein trunking control functions are performed in a distributed manner by said plural trunking means without control by said site controller means upon the absence or failure of said site controller means.

2. A method for achieving reliable radio frequency communication within a trunked radio repeater system having a digital RF control channel and plural RF working channels, which working channels are assigned for temporary use by individual radio units specified by digital control signals on the control channel, said method comprising the steps of:

(a) operating a site controller central processor to originate trunking control signals specifying working channel assignments to calling radio units;

(b) transmitting RF messages specifying said working channel assignments over said RF control channel in response to receipt by a control channel trunking processor of trunking control signals from said site controller, said control channel trunking processor operating to communicate signals between said RF control channel and said site controller during normal operation of said site controller;

(c) sensing when said site controller fails by sensing the absence of receipt of trunking control signals from said site controller; and (d) originating calling radio unit working channel assignments at said control channel trunking processor and causing corresponding working channel assignment messages to be transmitted over said RF control channel in response to sensing failure of said site controller.

3. A method for achieving reliable RF communication within a trunked radio repeater system having a digital RF control channel and plural RF working channels, which working channels are assigned for temporary use of individual radio units specified by digital control RF signals transmitted on the control channel, said method including the steps of:

(a) receiving working channel requests originated and transmitted by calling radio units over said RF control channel with an RF receiver and applying said received requests to a control channel trunking processor associated with said control channel;

(b) in a normal mode of operation, performing the following steps:

(1) communicating said received requests from said control channel trunking processor to a site controller in response to digital messages received over said RF control channel and over said plural RF working channels by said control channel trunking processor, (2) generating working channel assignment messages with said site controller in response to said communicated requests, and (3) communicating said working channel assignment messages as trunking control signals from said site controller to said control channel trunking processor, thereby trunking said working channel;

(c) in a fail soft mode different from said normal mode, generating working channel assignment messages with said control channel trunking processor and without receiving trunking control signals from said site controller in response to said received requests; and (d) whether or not said site controller has failed, effecting transmission of said working channel assignment messages over said RF control channel with said control channel trunking processor.

4. A method for achieving reliable communication within a trunked radio repeater system having a digital RF control channel and plural RF working channels, which working channels are assigned for temporary use of individual radio units specified by digital control signals on the RF control channel, said method comprising the steps of:

(a) receiving working channel release RF signals transmitted by a radio unit temporarily assigned to said working channel with a processor associated with and dedicated to said working channel;

(b) de-assigning said working channel with said working channel processor in response to said received release signals;

(c) in a normal mode of operation, passing said received release signals from said working channel processor to a site controller; and (d) in a fail soft mode of operation, passing said received release signals directly to a further processor associated with said RF control channel, said RF control channel further processor performing real time processing functions associated with said RF control channel and said plural RF working channels.

5. A method as in claim 4 further including the steps of;

(e) transmitting digital signals over said working channel with said working channel processor at substantially 9600 bits per second;

(f) in said normal mode, reassigning said working channel with said site controller in response at least in part to said passed release signals; and (g) in said rail soft mode, reassigning said working channel with said control channel further processor in response, at least in part, to said passed release signals.

6. A method for achieving reliable communication within a trunked radio repeater system having a digital control RF channel and plural working RF channels, which working channels are assigned for temporary use of individual radio units specified by digital control signals on the control channel, said method comprising the steps of:

(a) providing a system capable of operating alternately in a normal mode and in a fail soft mode;

(b) in said normal mode, controlling the trunking of said plural working channels with a central site controller processor, including the step of communicating trunking control signals between said central site controller processor and plural trunking processors associated with said RF control channel and plural RF working channels; and (c) in said fail soft mode, controlling the trunking of said plural working channels in a distributed processing manner with said plural trunking processors trunking in said fail soft mode being performed independently of trunking control signals from said central site controller processor and including the step of communicating trunking control signals between said plural trunking processors.

7. A method as in claim 6 further including the step of performing real time signal processing functions associated with said control channel and plural working channels with said trunking processors.

8. A method as in claim 6 wherein said controlling step (c) includes passing control signals between said trunking card processors over a backup serial link connected therebetween, said backup serial link being inactive except when said system operates in said fail soft mode.

9. A method as in claim 6 wherein said providing step (a) includes causing said system to operate in said fail soft mode when said trunking card processor associated with said control channel fails to detect signals generated by said site controller processor for a preset time period.

10. A method as in claim 6 further including:

(1) generating synchronization pulses of a first width with a trunking processor associated with said control channel when said system operates in said normal mode;

(2) generating synchronization pulses of a second width different from said first width with said trunking processor associated with said control channel when said system operates in said fail soft mode;

(3) applying said synchronization pulses to trunking processors associated with said plural working channels; and (4) operating each of said working channel trunking processors in said fail soft mode whenever synchronization pulses of said second width are applied thereto.

11. A method for achieving reliable communication within a trunked radio repeater system having plural digital RF communications channels, which channels are assigned for temporary use of individual radio units, said method comprising the steps of:

(a) receiving digital control signals transmitted over a communications channel with a trunking processor associated with said communications channel;

(b) communicating said received digital control signals from said trunking processor to a site controller;

(c) generating trunking control signals with said site controller in response to said received digital control signals communicated thereto from said communications channel trunking processor;

(d) communicating said trunking control signals from said site controller to said trunking processor;

(e) operating said trunking processor in response to said communicated trunking control signals communicated thereto so as to effect transmitting on said channel; and (f) if said generating step (c) and/or said communicating step (d) are not performed due to failure or absence of said site controller, inhibiting further communicating of received digital signals as in step (b) from being performed and originating said trunking control signals with said trunking processor.

12. A method for achieving reliable communication within a trunked radio repeater system having a digital RF control channel and plural RF working channels, which working channels are assigned for temporary use of individual radio units specified by digital control signals on the control channel, said method comprising the steps of:
(a) operating said system alternately in a normal mode and in a fail soft mode;
(b) communicating digital control signals between a dispatch console and a down link trunking processor;
(c) in said normal mode, communicating said digital control signals between said down link trunking processor and a site controller; and
(d) in said fail soft mode, ceasing to receive signals from said site controller and instead communicating said digital control signals over a backup link between said down link trunking processor and a further trunking processor associated with said control channel.

13. A trunked radio repeater system having a digital control RF communications channel and plural working RF communication channels, which working channels are assigned for temporary use of individual radio units specified by digital control signals on the control channel, said system comprising:
plural discrete digital signal processing means associated with corresponding plural communications channels, each of said plural digital signal processing means for performing signal processing functions associated with the communications channel associated therewith;
site controller means for generating trunking control signals coordinating the functions of said plural digital signal processing means;
signal path means connected between each of said plural digital signal processing means and said site controller means for communicating said trunking control signals between said site controller means and said plural digital signal processing means and thereby effecting trunking of said communications channels;
alternate signal path means connected between each of said plural digital signal processing means for communicating trunking control signals between said plural digital signal processing means so as to facilitate and provide distributed trunking control; and
control means operatively associated with said plural digital signal processing means for sensing failure of said site controller means, for receiving digital control signals over said first-mentioned signal path means when said sensing reveals no failure of said site controller means, and for receiving digital control signals over said alternate signal path when said sensing reveals failure of said site controller means.

14. A system as in claim 13 wherein said control means operatively associated with said plural digital processing means includes means for sensing failure of said site controller mans in response to the absence of digital control signals applied by said site controller means to said first-mentioned signal path means and for communicating said sensed failure to the said plural digital signal processing means.

15. A system s in claim 14 wherein said control means also generates synchronization signals and applies said synchronization signals to said alternate signal path means.

16. A system as in claim 15 wherein:
said control means generates one type of synchronization signals when said sensing reveals said site controller means has not failed, generates a different type of synchronization signals at one of said signal processing means when said sensing reveals said site controller means has failed, and applies said synchronization signals to said alternate signal path means; and
all of said plural signal processing means except said one processing means synchronize with said synchronization signals applied to said alternate signal path means, and sense failure of said site controller in response to the type of synchronization signals applied to said alternate signal path means.

17. A system as in claim 13 wherein:
said control means periodically applies polling digital control signals to said alternative signal path means; and
the control means of all but said one signal processing means applies digital control signals responsive to said polling digital control signals to said alternative signal path means.

18. A trunked radio repeater system having a digital RF control channel and plural RF working channels, which working channels are assigned for temporary use of individual radio units specified by digital control signals on the control channel, said system including:
site controller means for originating working channel assignments to calling radio units and for generating trunking control signals indicating said working channel assignments; and
trunking processor means associated with and corresponding to said control channel and operatively connected to said site controller means for processing signals communicated over said control channel, said trunking processor means including:
means for effecting transmission of RF signals specifying said working channel assignments over said control channel in response to receipt of trunking control signals from said site controller means,
means for sensing when said site controller means fails, and
means coupled to said sensing means for independently originating working channel assignments to calling radio units without generation of said trunking control signals by said site controller means when failure of said site controller means is sensed.

19. A trunked radio repeater system having a digital RF control channel and plural RF working channels, which working channels are assigned for temporary use of individual radio units specified by digital control signals on the control channel, said system including:
trunking processor means associated with said control channel for receiving working channel requests from calling radio units over said control channel, said trunking processor means including means for communicating said received requests to a site controller means connected thereto when operating in a normal mode;
site controller means for generating trunking control signals in response to said passed requests and for communicating said trunking control signals to said control channel trunking card;

said trunking processor means further including means for independently generating trunking control signals in response to said received requests when operating in a fail soft mode of operation different from said normal mode, and means for effecting transmission of corresponding working channel assignment messages in the from of RF signals over said control channel.

20. A trunked radio repeater system having a digital control channel and plural working channels, which working channels are assigned for temporary use of individual radio units specified by digital control signals on the control channel, said system including:

processing means associated with said working channel for receiving working channel release signals transmitted by a radio unit temporarily assigned to said working channel and for processing digital signals communicated over said working channel, said processing means including:

means for de-assigning said working channel in response to said received release signals, first means operative in a normal mode of operation for forwarding said received release signals from said processing means to a site controller, and second means operative in a fail soft mode of operation for forwarding said received release signals over a backup communications link to a further processor means associated with said control channel, said further processor means for performing processing of digital signals associated with said control channel.

21. A system as in claim 20 wherein:

said processing means includes means for transmitting digital signals over said working channel at substantially 9600 bits per second;

said site controller reassigns said working channel in response at least in part to said passed release signals during operating in said normal mode; and said further processor includes means for reassigning said working channel in response, at least in part, to said passed release signals during operation in said fail soft mode.

22. A trunked radio repeater system having a digital control channel and plural working channels, which working channels are assigned for temporary use of individual radio units specified by digital control signals on the control channel, said system operating alternately in a normal mode and in a fail soft mode, said system comprising:

a central site controller processor operative in said normal mode for controlling the trunking of said plural working channels through plural individual trunking processor means associated with said control channel and plural working channels; and said plural trunking processor means operative in said fail soft mode for cooperating and communicating with one another to control the trunking of said plural working channels in a distributed manner without requiring trunking control by said site controller.

23. A system as in claim 22 wherein said plural trunking processor means performs real time signal processing functions associated with said control channel and plural working channels.

24. A system as in claim 22 further including a backup serial link connected between said plural trunking processor means for passing control signals between said trunking processor means, said backup serial link being inactive except when said system operates in said fail soft mode.

25. A system as in claim 22 wherein said system includes means for causing said system to operate in said fail soft mode when a trunking processor means associated with said control channel fails to detect signals generated by said site controller.

26. A system as in claim 22 wherein:

said trunking processor means associated with said control channel includes means for generating synchronization pulses of a first width when said system operates in said normal mode, for generating synchronization pulses of a second width different from said first width when said system operates in said fail soft mode, and for applying said synchronization pulses to trunking processor means associated with said plural working channels; and each of said working channel trunking processor means operate in said fail soft mode whenever synchronization pulses of said second width are applied thereto.

27. A trunked radio repeater system having a digital control channel and plural working channels, which working channels are assigned for temporary use of individual radio units specified by digital control signals on the control channel, said system comprising:

trunking processor means associated with a single communications channel for receiving digital control signals transmitted over said communications channel and for communicating said received digital control signals to a central site controller means operatively coupled thereto;

said site controller means for generating trunking control signals in response to said received digital control signals applied thereto and for passing said trunking control signals to said trunking processor means;

said trunking processor means also for effecting trunking of said channel, and if said site controller means fails, for effecting trunking of said channel and generating trunking control signals in the absence of said trunking control signals generated by said site controller means.

28. A trunked radio repeater system having a digital control channel and plural working channels, which working channels are assigned for temporary use of individual radio units specified by digital control signals on the control channel, said system including a dispatch console, a down link trunking processor, a site controller, and further trunking processors associated with said control channel and RF working channels, said system comprising:

means for operating said system alternately in a normal mode and in a fail soft mode;

means connected between said dispatch console and said downlink trunking processor for communicating digital control signals between said dispatch console and said down link trunking processor;

means connected between said down link trunking processor and said site controller operative in said normal mode for communicating said digital control signals between said down link trunking processor and a site controller; and backup link means connected between said down link trunking processor and said further trunking processors operative in said fail soft mode for communicating said digital control signals between said downlink trunking processor and said further trunking processor instead of between said downlink trunking processors and said site controller, said backup link communicating said digital control signals between said further trunking processors and said console upon failure or absence of said site controller.

29. A method for achieving RF communications channel trunking within a trunked radio frequency communications system having a digital control RF channel and plural working RF channels, which working channels are assigned for temporary use by individual radio units specified by digital control signals communicated over the control channel, said method including the steps of:

providing, for each of said RF channels, an RF transceiver and an associated digital trunking processor, each said trunking processor controlling the operation of its associated RF transceiver; and controlling the temporary assignment of said plural working channels in a distributed manner using said plural trunking processors corresponding to and associated with said RF control channel nd plural RF working channels, said plural trunking processors communicating trunking commands therebetween and thereby coordinating the trunking of said RF working channels.

30. In a digitally trunked radio frequency communications system of the type which temporarily assigns RF channels to mobile digital radio transceivers in response to channel request messages transmitted by said mobile digital radio transceivers over an RF control channel, a method of providing distributed trunking control including the following steps:

(a) receiving a channel assignment request message with a first trunking means associated with and corresponding to said digital RF control channel;

(b) generating a working channel assignment specifying an RF communication working channel with said first trunking means in response to said request message;

(c) transmitting a RF channel assignment message identifying said working channel over said RF control channel in response to said generated working channel assignment; and (d) temporarily assigning said RF working channel and facilitating communications to occur over said RF working channel in response to said generated working channel assignment with a second trunking means associated with and corresponding to said RF working channel, said first and second trunking means cooperating together and communicating digital trunking commands therebetween to provide distributed trunking control of said RF working channel.

31. A method as in claim 30 wherein said method further includes the step of communicating said generated working channel assignment from said first trunking means directly to said second trunking means over a backup communications link.

32. A method as in claim 31 wherein said method further includes the following steps:

(i) testing for completion of said communications over said working RF channel with said second trunking means;

(ii) deassigning sad working RF channel with said second trunking means when said testing step reveals said communications have completed; and (iii) communicating a message indicating said deassignment from said second trunking means to said first trunking means over said backup communications link.

33. A method as in claim 32 further including the preliminary steps of:

(i) generating said channel assignment request message with a console; and (ii) communicating said channel assignment request message from said console to said first trunking means over said backup communications link.

34. In a digitally trunked radio frequency communications system of the type which temporarily assigns RF channels to mobile digital radio transceivers in response to channel request messages received over an RF control channel, a distributed processing system for providing distributed trunking control including:

first trunking means associated with and corresponding to said RF control channel for receiving a channel assignment request message, for generating a working channel assignment specifying an RF working channel in response to said request message, and for transmitting a RF channel assignment message specifying said RF working channel over said RF control channel in response to said generated working channel assignment; and second trunking means, associated with and corresponding to said RF working channel, said second trunking means and being connected to receive said generated working channel assignment, said second trunking means for temporarily assigning said RF working channel and for facilitating communications to occur over said RF working channel in response to said generated working channel assignment, said first and second trunking means cooperating together and communicating digital trunking commands therebetween to provide distributed trunking control to control trunking of said RF working channel.

35. A method as in claim 34 further including backup communications means connected between said first and second trunking means for communicating said generated working channel assignment from said first trunking means directly to said second trunking means.

36. A system as in claim 35 wherein said second trunking means includes:

means for testing for completion of said communications over said RF working channel, means for deassigning said RF working channel when said testing means reveals said communications have completed, and means connected to said backup communications means for communicating a message indicating said deassignment from said second trunking means to said first trunking means.

37. A system as in claim 35 further including:

console means for generating said channel assignment request message; and downlink means connected between said console means and said backup communications means for communicating said channel assignment request message from said console means to said first trunking means over said backup communications means.

38. A system as in claim 34 further including mobile transceiver means for generating said channel assignment request message and for communicating said channel assignment request message to said control trunking means over said first RF channel.

39. A digitally trunked radio frequency communications system which temporarily assigns RF working channels to mobile digital radio transceivers transmitting digitally encoded working channel request signals over an RF digital control channel, said system including:
- a control channel RF transceiver for transmitting and receiving digitally encoded RF control signals over said RF control channel;
- a control channel signal processing means operatively connected to said control channel RF transceiver for processing said transmitted and received RF control signals and for controlling the operation of said control channel RF transceiver;
- plural working channel RF transceivers for transmitting and receiving RF working channel signals over corresponding plural RF working channels;
- plural working channel trunking processor means, separate from and operatively connected to said control channel signal processing means, said plural working channel trunking processor means corresponding to said plural working channel RF transceivers, said plural working channel trunking processor means for controlling the operation of said working channel RF transceivers;
- control channel trunking means connected to said control channel RF transceiver for receiving channel assignment request messages form said mobile transceivers, for generating working channel assignments, and for controlling said control channel signal processing means to effect transmission of responsive channel assignment messages specifying said working channel assignments over said control channel;
- said working channel trunking processor means being connected to receive said generated working channel assignments for controlling said working channel transceivers to effect transmission of RF working channel signals over said assigned working channel in response to said working channel assignments,
- wherein said control channel trunking means and said working channel trunking processor means each include a digital signal processor, said digital signals processors cooperating together and communicating digital trunking commands therebetween so as to provide distributed trunking control over said plural RF working channels.

40. A system as in claim 39 further including backup link means connected between said control channel trunking means and said working channel trunking means for communicating digital signals indicating said generated working channel assignments from said control channel trunking means to said working channel trunking means.

41. A system as in claim 40 wherein said control channel trunking means includes means for polling said working channel trunking means over said backup link means.

42. A system as in claim 41 wherein:
said polling means includes means for generating an update poll message and for communicating said update poll message to said working channel trunking means over said backup link means; and
said working channel trunking means includes means for receiving said update poll message and means for responding to said update poll message if said working channel trunking means has released said working channel since receipt of a previously received update poll message.

43. A system as in claim 42 wherein said backup link means includes time division multiplexing means for providing time division multiplexed serial digital signals between said control channel trunking means and said working channel trunking means over said backup link means.

44. A system as in claim 39 further including:
console means for generating working channel request messages; and
backup link means, connecting said console means, said control channel trunking means and said working channel trunking means, for: (a) communicating said console-generated working channel request messages from said console means to said control channel trunking means, and (b) communicating messages indicating said working channel assignments from said control channel trunking means to said working channel trunking means.

45. A system as in claim 39 wherein:
said control channel trunking means includes storing means for storing said generated working channel assignments;
said working channel trunking means includes working channel deassignment means for controlling said working channel signal processing means to release said working channel in response to completion of working channel RF signalling over said working channel; and
said system further includes backup link means connected between said working channel trunking means and said control channel trunking means for updating the stored contents of said storing means in response to said working channel release.

46. A trunked radio frequency repeater/transmitter system including:
a control channel radio frequency transceiver which exchanger digitally encoded RF control signals with mobile radio transceivers over an RF control channel, some of said exchanged RF control signals directing mobile radio transceivers to communicate on an RF working channel;
a working channel radio frequency transceiver which exchanges RF signals with mobile radio transceivers over said RF working channel; and
plural distributed trunking processors associated with said control channel RF transceiver and said RF working channel transceiver, said plural distributed trunking processors exchanging digital trunking control signals therebetween over a digital signal link so as to provide trunking operation of said system.

47. In a digitally trunked radio communications system having a digital RF control channel and plural RF working channels, said RF working channels being temporarily assigned in response to RF control signals passed over said digital RF control channel, a method of controlling trunking of said working channels comprising:
(a) receiving a channel request message over said RF control channel;

(b) generating, in response to said received channel request message, a channel assignment message at a first trunking processor associated with said control channel, said channel assignment message specifying an RF working channel for assignment;

(c) transmitting said channel assignment message over said RF control channel;

(d) communicating a channel assignment command from said first trunking processor to a further trunking processor associated with said RF working channel to be assigned; and (e) controlling, with said further trunking processor in response to said communicated channel assignment command, an RF working channel transceiver associated with said specified RF working channel.

48. In a digitally trunked RF communications system having an RF control channel and plural RF working channels, said working channels being temporarily assigned in response to digital control signals passed over said control channel, a method of operating said system comprising:

normally providing centralized control of RF working channel trunking with a centralized site controller computer; and operating in a fail soft mode to provide distributed control of RF working channel trunking in response to failure of said centralized site controller computer.

* * * * *